(12) United States Patent
Takyo et al.

(10) Patent No.: US 9,612,579 B2
(45) Date of Patent: Apr. 4, 2017

(54) ELECTRONIC CLOCK

(71) Applicants: CITIZEN HOLDINGS CO., LTD., Tokyo (JP); CITIZEN WATCH CO., LTD., Tokyo (JP)

(72) Inventors: Yu Takyo, Nishitokyo (JP); Masaaki Namekawa, Kiyose (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 14/415,735

(22) PCT Filed: Jul. 23, 2013

(86) PCT No.: PCT/JP2013/069952
§ 371 (c)(1),
(2) Date: Jan. 20, 2015

(87) PCT Pub. No.: WO2014/017502
PCT Pub. Date: Jan. 30, 2014

(65) Prior Publication Data
US 2015/0160619 A1    Jun. 11, 2015

(30) Foreign Application Priority Data

Jul. 23, 2012   (JP) ................. 2012-162895

(51) Int. Cl.
*G04C 3/14* (2006.01)
*H02P 8/02* (2006.01)
(Continued)

(52) U.S. Cl.
CPC .............. *G04C 3/146* (2013.01); *G04C 3/14* (2013.01); *G04C 3/143* (2013.01); *H02P 8/02* (2013.01);
(Continued)

(58) Field of Classification Search
CPC .. G04C 3/14; G04C 3/143; H02P 8/08; H02P 8/18; H02P 8/22
(Continued)

(56) References Cited

U.S. PATENT DOCUMENTS 4,361,410 A * 11/1982 Nakajima ............. G04C 3/143
318/696
4,477,196 A * 10/1984 Ito ......................... G04C 3/143
368/157
(Continued)

FOREIGN PATENT DOCUMENTS

CN    101582669 A    11/2009
CN    101610059 A    12/2009
(Continued)

OTHER PUBLICATIONS

International Search Report for PCT/JP2013/069952 dated Sep. 3, 2013.
(Continued)

*Primary Examiner* — Amy Cohen Johnson
*Assistant Examiner* — Daniel Wicklund
(74) *Attorney, Agent, or Firm* — Hubbs, Enatsky & Inoue PLLC

(57) ABSTRACT

Provided is an electronic clock which is capable of finely controlling a driving force of a normal driving pulse and suppresses variation in current consumption without an increase in circuit size. The electronic clock is configured so that while a chopped driving pulse is output and in an interval in which coil terminals have heretofore been short-circuited, a pulse is output (hereinafter referred to as adjustment pulse) for control from a terminal that is different from a terminal of a motor driver from which the normal driving pulse has been output. The output pattern of the adjustment pulse is changed with reference to a driving rank selecting
(Continued)

circuit to increase or decrease a motor driving current and hence change the driving force.

19 Claims, 16 Drawing Sheets

(51) Int. Cl.
    *H02P 8/08* (2006.01)
    *H02P 8/18* (2006.01)
    *H02P 8/22* (2006.01)
(52) U.S. Cl.
    CPC .............. *H02P 8/08* (2013.01); *H02P 8/18* (2013.01); *H02P 8/22* (2013.01)
(58) Field of Classification Search
    USPC ............................................. 368/80; 318/696
    See application file for complete search history.

(56) References Cited

U.S. PATENT DOCUMENTS

| | | | | |
|---|---|---|---|---|
| 5,166,590 A | * | 11/1992 | Tu | G04C 3/143 318/685 |
| 5,933,392 A | * | 8/1999 | Sato | G04C 3/143 318/685 |
| 6,452,358 B1 | * | 9/2002 | Iijima | G04C 3/14 318/140 |
| 6,476,579 B1 | * | 11/2002 | Akahane | G04C 3/143 318/599 |
| 2009/0285057 A1 | | 11/2009 | Ogasawara | |
| 2009/0316535 A1 | | 12/2009 | Ogasawara et al. | |
| 2010/0164426 A1 | | 7/2010 | Honmura et al. | |
| 2010/0238767 A1 | | 9/2010 | Honmura et al. | |
| 2012/0204640 A1 | * | 8/2012 | Takyo | H02P 8/02 73/504.04 |
| 2012/0307602 A1 | * | 12/2012 | Namekawa | G04C 3/143 368/204 |
| 2013/0170328 A1 | * | 7/2013 | Manaka | G04B 99/00 368/200 |

FOREIGN PATENT DOCUMENTS

| | | | |
|---|---|---|---|
| CN | 101764558 A | 6/2010 | |
| CN | 102782593 A | 11/2012 | |
| DE | 3217207 A1 | 11/1982 | |
| JP | S56-44876 A | 4/1981 | |
| JP | S57-77984 A | 5/1982 | |
| JP | H01-42395 B2 | 9/1989 | |
| JP | H07-120567 A | 5/1995 | |
| JP | H08-33457 B2 | 3/1996 | |
| JP | H09-266697 A | 10/1997 | |
| JP | H11-352251 A | 12/1999 | |
| JP | 2010-220408 A | 9/2010 | |
| JP | WO 2011099536 A1 * | 8/2011 | ............ G04C 3/143 |

OTHER PUBLICATIONS

European Search Report and the European Search Opinion application No. 13823043.8. mailed on Feb. 18, 2016.

* cited by examiner

FIG.9
(a)
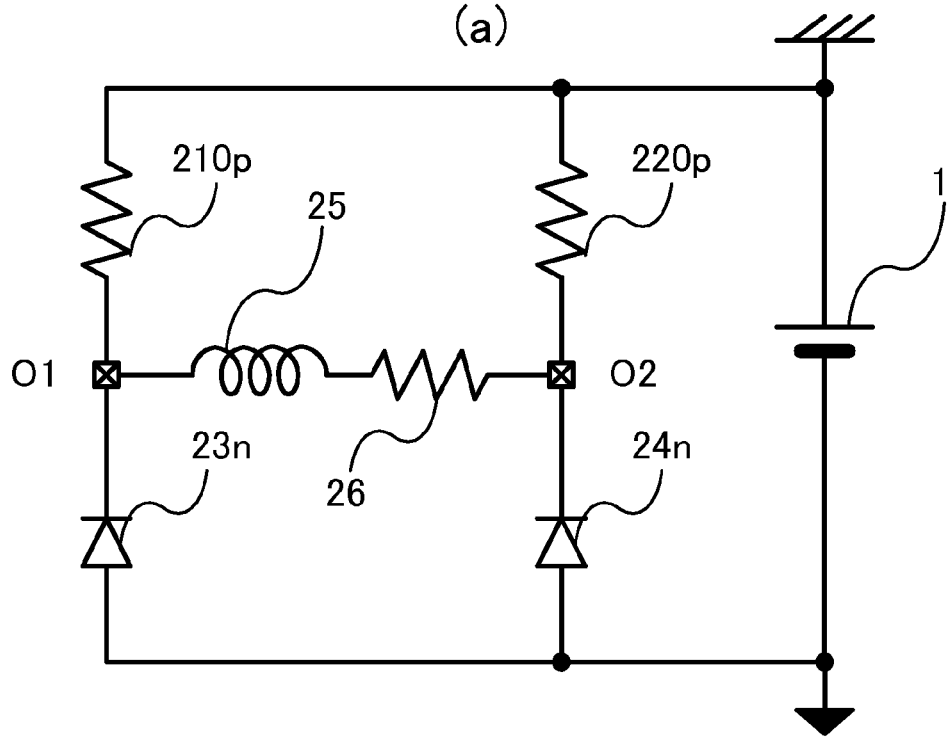
(b)
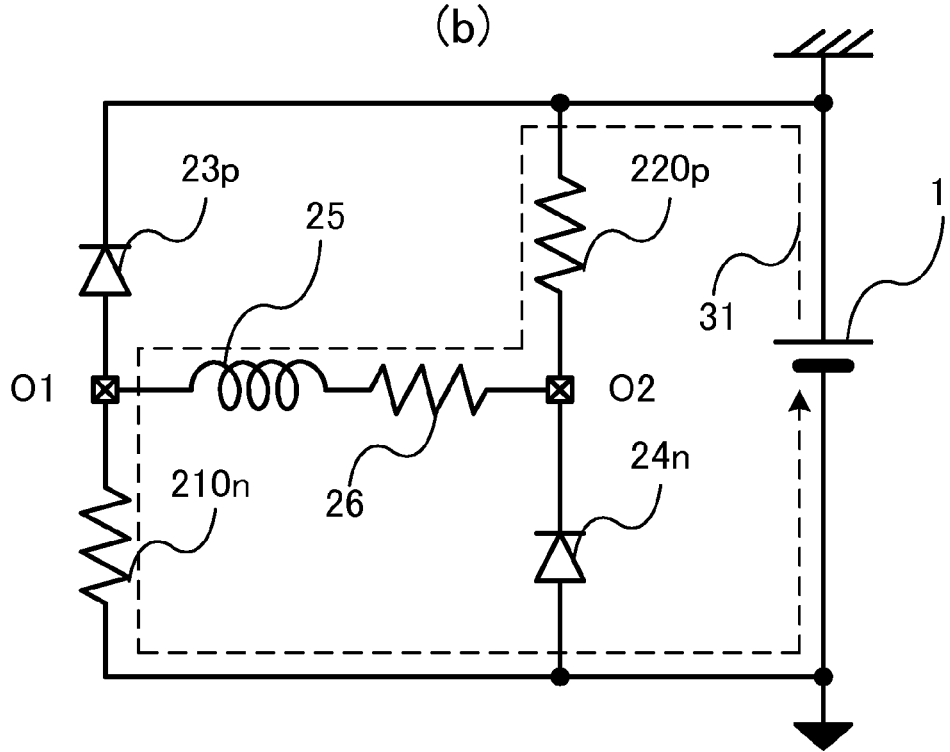

FIG.9
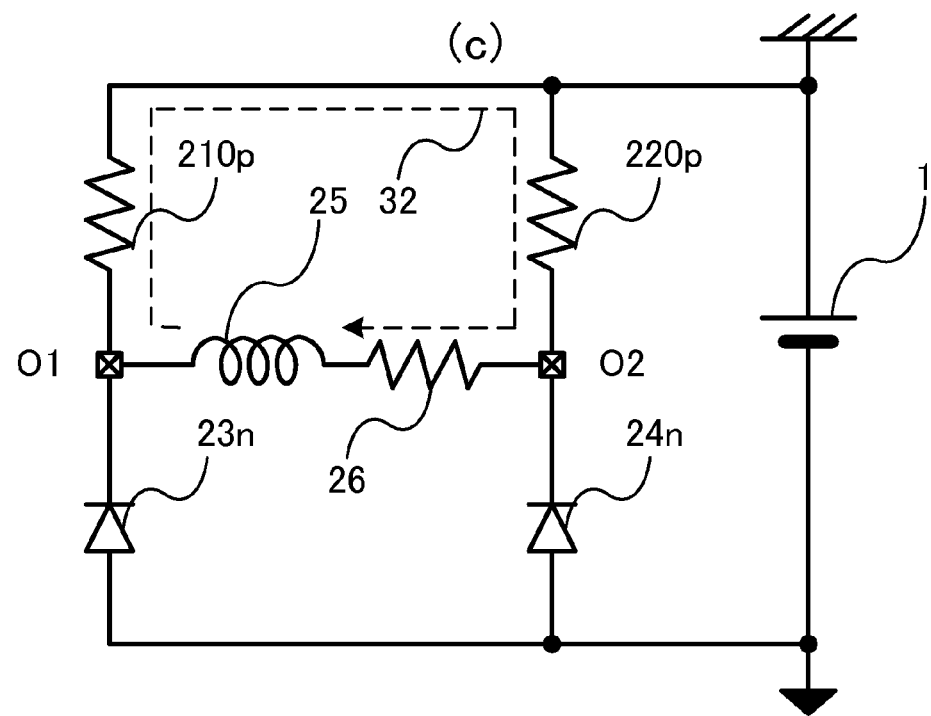
(c)
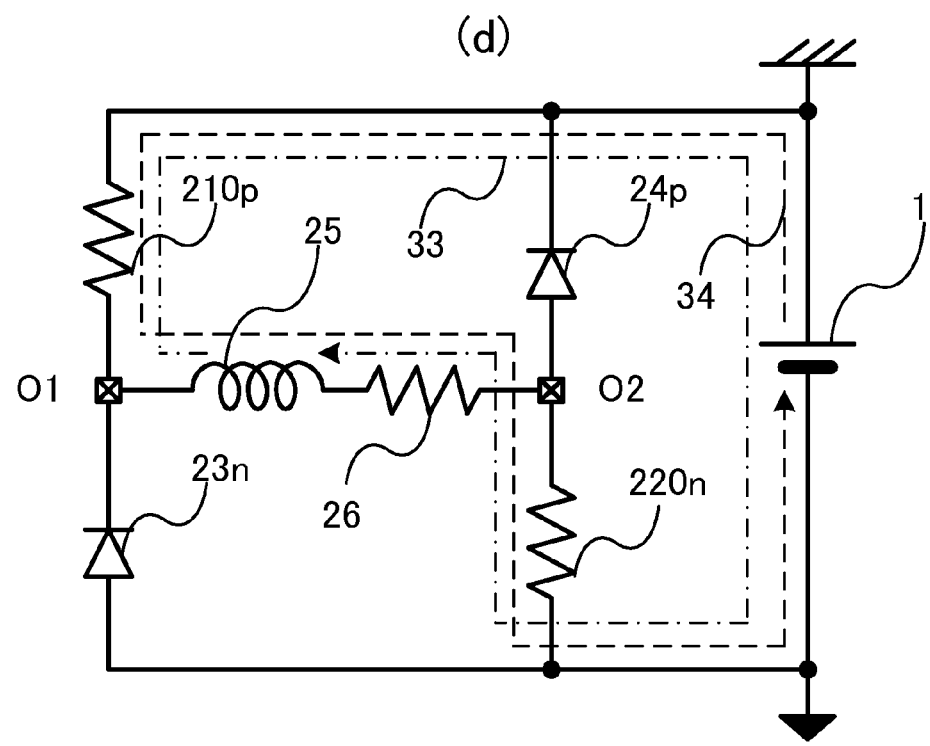
(d)

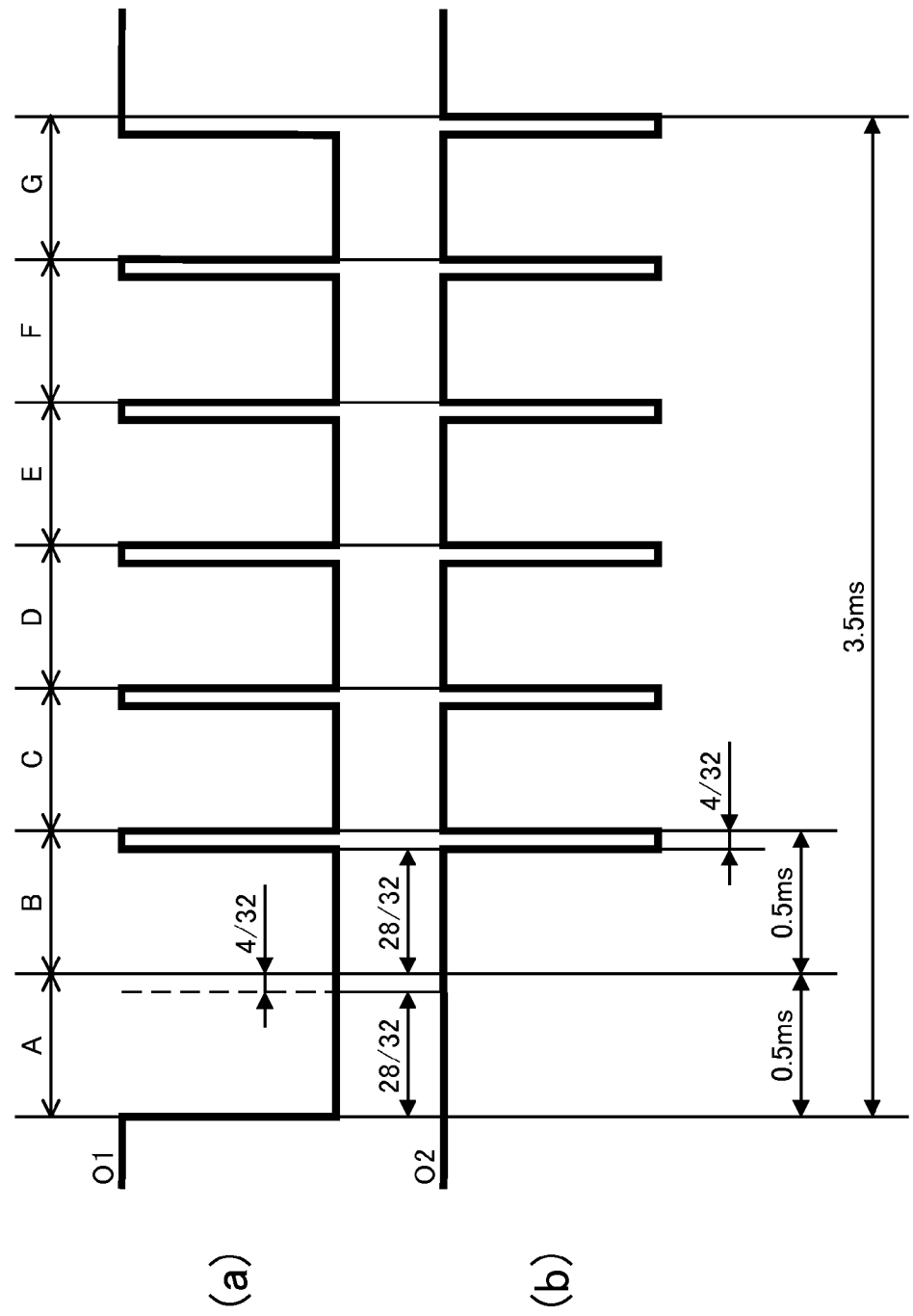

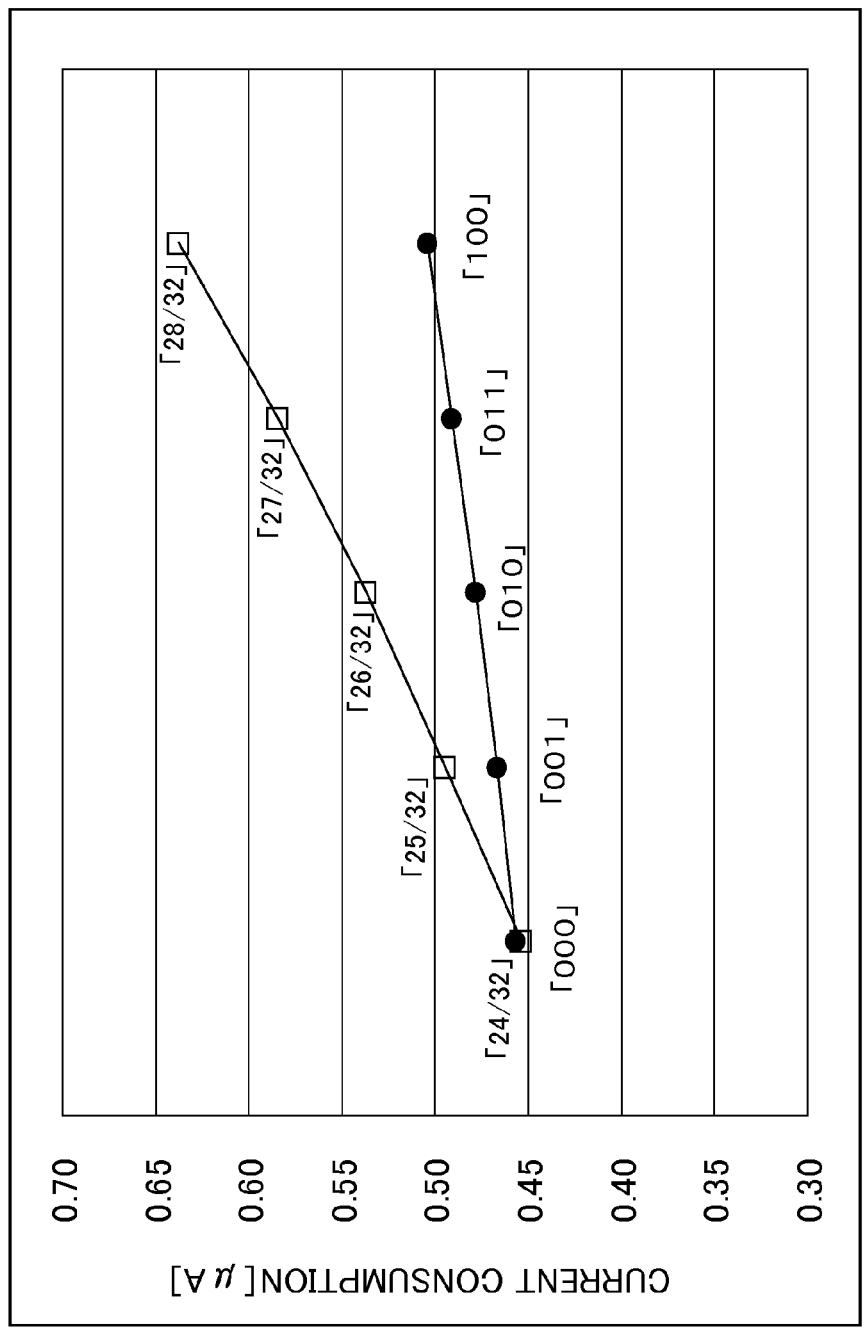

ELECTRONIC CLOCK

CROSS REFERENCE TO RELATED APPLICATIONS

This application is a National Stage of International Application No. PCT/JP2013/069952 filed Jul. 23, 2013, claiming priority based on Japanese Patent Application No. 2012-162895 filed on Jul. 23, 2012. The contents of each of the above documents are incorporated herein by reference in their entirety.

TECHNICAL FIELD

The present invention relates to an electronic clock including a stepping motor.

BACKGROUND ART

In the related art, in an electronic clock, there has been adopted a method in which, in order to reduce current consumption, a plurality of normal driving pulses having different driving forces are prepared and one of the normal driving pulses that can be driven with a minimum energy is always selected to drive a motor. To briefly describe the selection method, a normal driving pulse having a predetermined driving force is output first, and subsequently it is determined whether the motor has rotated. Then, when the motor has not rotated, a separately-prepared compensation driving pulse having a larger driving force is output immediately to positively rotate a rotor, and the next time the normal driving pulse is output, a switch is made to output a normal driving pulse having a driving force that is one rank higher than the previous one. On the other hand, when the motor has rotated, the next time the normal driving pulse is output, the same normal driving pulse as the previous one is output. Then, the normal driving pulse is selected by a method in which, when the same driving pulse is output a predetermined number of times, a switch is made to a normal driving pulse having a driving force that is lower by one rank.

Note that, as the related-art method of detecting whether or not the rotor has rotated, there has often been used a method in which, after finishing application of the normal driving pulse, a rotation detection pulse is output to steeply change an impedance value of a coil of a stepping motor, and an induced voltage generated in the coil is detected across coil terminals to make a rotation determination based on a free vibration pattern of a rotor (see, for example, Patent Literatures 1, 2, and 3).

Moreover, Patent Literature 4 describes, as the method of changing the driving force of the normal driving pulse, a method in which a driving pulse is composed of a plurality of subpulses (the plurality of subpulses of the driving pulse are hereinafter referred to as "choppers"), and duties of the subpulses (choppers) are controlled to change pulse widths. Note that, such a driving pulse composed of the plurality of choppers is hereinafter referred to as "chopper driving pulse".

CITATION LIST

Patent Literature

[Patent Literature 1] JP 7-120567 A (paragraphs 0018 to 0024 and FIGS. 7)
[Patent Literature 2] JP 8-33457 B (page 3, sixth column, line 26 to page 4, column 7, line 39, and FIGS. 4 to 6)
[Patent Literature 3] JP 1-42395 B (page 5, column 9)
[Patent Literature 4] JP 9-266697 A (paragraph 0013 and FIG. 5)

SUMMARY OF INVENTION

Technical Problem

In the related-art technologies, when no rotation is determined based on the motor rotation detection after outputting the normal pulse, the next time the normal driving pulse is output, the normal pulse having a driving force that is one rank higher than the previous one is output. However, at that time, all duty ratios are changed to be ranked up for the respective choppers of the normal driving pulse, and hence an amount of increase in current consumption is large.

Therefore, when motors are individually different in driving force due to eccentricity of rotors and the like, there exist a motor that can be rotated with a normal driving pulse having a low driving force, which is an original set value, and a motor that can only be rotated with a normal driving pulse having a high driving force that is ranked-up by one. The amount of increase in current consumption for each rank up is large, and hence the motor that can only be rotated with a normal driving pulse that is higher by one rank may cause a problem of inability to achieve a predetermined battery life. This is because, for increased sales of clocks, there are tendencies to set as the battery life a larger number of years than before (for example, 3 years where it was 2 years), and to set a value of current consumed by the motor and a driving force of a normal driving pulse for realizing the value to minimum feasible values.

In the related-art technologies, the driving force is controlled with an amount of change per rank of the normal driving pulse being set to about 16 µs, which is a half period of an oscillator frequency of a crystal oscillator, which is 32 kHz. In contrast, in order to suppress the amount of increase in current consumption for each rank up, it is also possible to contemplate a method in which, for example, a multiplying circuit is used to generate a reference signal of 64 kHz, which is twice the oscillator frequency, and an amount of change in driving force for each rank up is controlled more finely with the amount of change of the normal driving pulse being set to about 8 µs, which is a half period of the signal.

However, with this method, a circuit size is disadvantageously increased because the multiplying circuit is required. In addition, there is also a problem in that driving of the multiplying circuit leads to an increase in current consumption in the circuit.

It is an object of the present invention to provide an electronic clock which is capable of finely controlling a driving force of a normal driving pulse and suppresses variation in current consumption of a motor without increasing a circuit size by a multiplying circuit or the like.

Solution to Problem

In order to achieve the above-mentioned object, an electronic clock according to one embodiment of the present invention has the following configuration. That is, the electronic clock includes: a bipolar stepping motor (9); a motor driver (8) including two driving terminals for driving the stepping motor (9); a driving pulse generating circuit (3) for outputting an original signal of a chopper driving pulse for driving the stepping motor (9); a selector (7) for outputting the original signal of the chopper driving pulse, which has been generated by the driving pulse generating circuit (3), to the motor driver (8); and an adjustment pulse generating circuit (4) for outputting an original signal of an adjustment pulse, which is output in an OFF period between outputs of choppers of the chopper driving pulse, to the selector (7), in which the selector (7) outputs the original signal of the adjustment pulse to the motor driver (8) so that the adjustment pulse is output from a driving terminal that is different from a driving terminal from which the chopper driving pulse is output.

Advantageous Effects of Invention

As described above, according to one embodiment of the present invention, in the chopped normal driving pulse, during the heretofore chopper OFF period of the pulse, the pulse (hereinafter referred to as adjustment pulse) is output from the terminal that is different from the terminal of the motor driver from which the normal driving pulse has been output. The adjustment pulse is a pulse for suppressing the driving force of the normal driving pulse. The output pattern of the adjustment pulse is controlled to allow the driving force of the normal driving pulse to be set finely without using the multiplying circuit.

In addition, because the multiplying circuit or the like is not required, incorporation of the present invention may be readily applied to related-art products without greatly changing the circuit configuration.

BRIEF DESCRIPTION OF DRAWINGS

FIG. 9(a) is an equivalent circuit diagram illustrating a state of the motor driver of the electronic clock according to the first embodiment of the present invention, the state being before t0.

FIG. 9 (b) is an equivalent circuit diagram illustrating a state of the motor driver of the electronic clock according to the first embodiment of the present invention, the state being between t0 and t1.

FIG. 9(c) is an equivalent circuit diagram illustrating a state of the motor driver of the electronic clock according to the first embodiment of the present invention, the state being at t1.

FIG. 9(d) is an equivalent circuit diagram illustrating a state of the motor driver of the electronic clock according to the first embodiment of the present invention, the state being between t1 and t2.

FIG. 14 is a waveform diagram of the pulses generated by the circuits of the electronic clock according to the third embodiment of the present invention.

FIG. 15 is a graph comparing amounts of change in current consumption per rank of stepping motors of the electronic clock according to the third embodiment of the present invention and the related-art electronic clock.

DESCRIPTION OF EMBODIMENTS

[First Embodiment]

According to a first embodiment of the present invention, during a chopper OFF period of a normal driving pulse, an adjustment pulse is output from a terminal that is different from a terminal of a motor driver from which the normal driving pulse has been output, and an output pattern of the adjustment pulse is changed to finely control a driving force. Now, the first embodiment according to the present invention is described with reference to the drawings.

Figure 1:
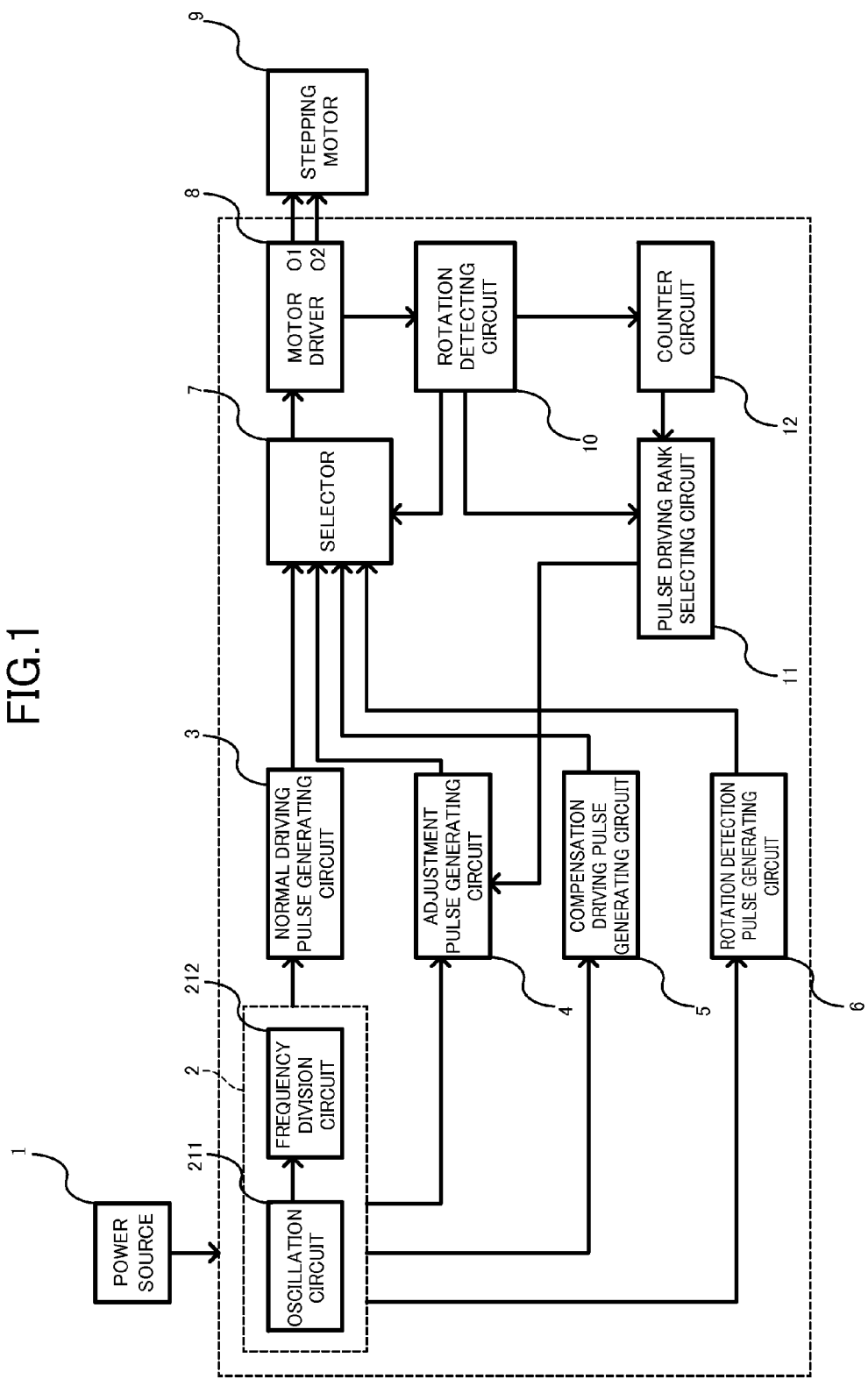
FIG. 1 is a block diagram illustrating a circuit configuration according to first and second embodiments of the present invention.
Figure 10:
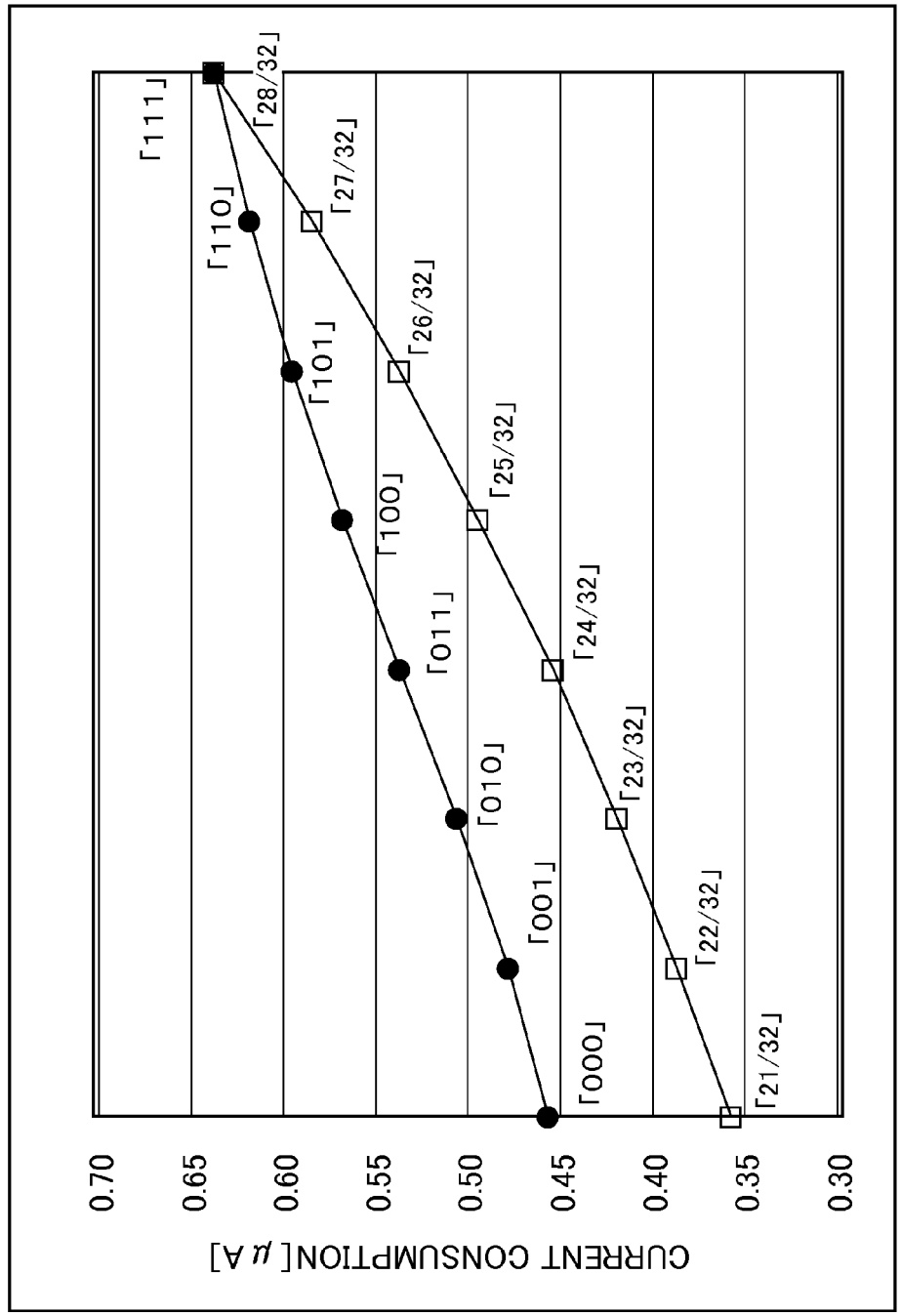
FIG. 10 is a graph comparing amounts of change in current consumption per rank of stepping motors of the electronic clock according to the first embodiment of the present invention and a related-art electronic clock.

FIG. 1 is a block diagram illustrating a circuit configuration of an electronic clock according to the first embodiment of the present invention, and FIGS. 2 to 7 are waveform diagrams of various pulses generated by circuits of the electronic clock according to the first embodiment of the present invention, in which part (a) shows a voltage waveform generated at one terminal O1 of a coil and illustrates a chopper driving pulse that is a group of seven subpulses, and part (b) shows a voltage waveform generated at the other terminal O2 of the coil and illustrates an adjustment pulse that is a group of 7 to 0 subpulses generated in a subpulse OFF interval a1. Part (c) shows current waveforms generated in the coil. Note that, the waveforms generated at the terminals O1 and O2 are alternate pulses which reverse phases for each step. FIGS. 8 and 9 of the present invention are equivalent circuit diagrams illustrating states of the motor driver of the electronic clock according to the first embodiment of the present invention, and FIG. 10 is a graph comparing changes in current consumption per rank of stepping motors of the electronic clock according to the first embodiment of the present invention and a related-art electronic clock.

In FIG. 1, reference symbol 1 denotes a power source, and reference symbol 2 denotes a reference signal generating circuit, including an oscillation circuit 211 for oscillating a crystal oscillator (not shown) to generate a reference clock, and a frequency division circuit 212 for dividing a frequency of the reference signal from the oscillation circuit 211. Reference symbol 3 denotes a normal driving pulse generating circuit for generating, with reference to the reference signal generating circuit 2, pulses having a width of 3.5 ms every 0.5 ms so as to have a chopper duty ratio of 28/32 as shown in part (a) of FIGS. 2 to 6. Note that, the interval after a chopper having the duty ratio of 28/32 is output and before the next chopper is output (for example, "a1" in FIG. 2) is referred to as "OFF interval". In the first embodiment, the chopper duty ratio of the normal driving pulse is fixed at 28/32 for any rank, which is to be described below.

Note that, the waveform shown in part (a) of FIGS. 2 to 6 represents a signal output from the O1 terminal of a motor driver 8, which is to be described below, and an original signal that is actually output from the normal driving pulse generating circuit 3 is a signal in which a high electric potential and a low electric potential are reversed.

Reference symbol 4 denotes an adjustment pulse generating circuit for generating, with reference to the reference signal generating circuit 2, an adjustment pulse having a chopper duty ratio of 4/32 as shown in part (b) of FIGS. 2 to 5. The adjustment pulse includes subpulses (for example, "a2") output during output OFF periods (for example, "a1") of the normal driving pulse, and different waveform patterns are generated as in part (b) of FIG. 2 in which subpulses are output in all periods A to G, part (b) of FIG. 3 in which subpulses are output in periods B to G, part (b) of FIG. 4 in which subpulses are output in periods C to G, part (b) of FIG. 5 in which subpulses are output in periods D to G, and part (b) of FIG. 6 in which no subpulses are output in any period. The adjustment pulse generating circuit 4 selects and outputs, with reference to a pulse driving rank selecting circuit 11 to be described below, one of the different waveform patterns of the adjustment pulse.

Note that, the waveform shown in part (b) of FIGS. 2 to 6 represents a signal output from the O2 terminal of the motor driver 8, which is to be described below, and an original signal that is actually output from the adjustment pulse generating circuit 4 is a signal in which a high electric potential and a low electric potential are reversed.

Reference symbol 5 denotes a compensation driving pulse generating circuit for generating a compensation driving pulse with reference to the reference signal generating circuit 2, and reference symbol 6 denotes a rotation detection pulse generating circuit for generating a rotation detection pulse with reference to the reference signal generating circuit 2.

Reference symbol 7 denotes a selector for selecting and outputting the pulses output from the normal driving pulse generating circuit 3, the adjustment pulse generating circuit 4, the compensation driving pulse generating circuit 5, and the rotation detection pulse generating circuit 6 on the basis of a determination result of a rotation detecting circuit 10, which is to be described below. Reference symbol 8 denotes a motor driver for supplying the signal output from the selector 7 to a coil (not shown) of a bipolar stepping motor 9, which is to be described below, and transmitting a rotation state of a rotor (not shown) of the stepping motor 9, which is to be described below, to the rotation detecting circuit 10, which is to be described below. Therefore, the motor driver 8 has two output terminals O1 and O2 for supplying the signal to the coil of the stepping motor 9.

Reference symbol 9 denotes a stepping motor including a coil (not shown) and a rotor (not shown), for driving hands (not shown) via a wheel train (not shown).

Reference symbol 10 denotes a rotation detecting circuit for determining whether or not the rotor of the stepping motor 9 has rotated, and controlling the selector 7 as well as a pulse driving rank selecting circuit 11 and a counter circuit 12, which are to be described below.

Reference symbol 11 denotes a pulse driving rank selecting circuit for selecting, when the rotation detecting circuit 10 detects that the rotor has not rotated or when the counter circuit 12, which is to be described below, counts a predetermined number of times the rotor has rotated, a predetermined value to change the output pattern of the adjustment pulse and control the adjustment pulse generating circuit 4.

Reference symbol 12 denotes a counter circuit for counting the number of times it is determined that the rotor (not shown) of the stepping motor 9 has rotated, and controlling the pulse driving rank selecting circuit 11. The counter circuit 12 is further configured to be reset when it is determined that the rotor has not rotated, and count the number of times it is determined that the rotor has rotated in succession.

Note that, in the pulse driving rank selecting circuit 11, when values of the pulse driving rank selecting circuit 11 for selecting the subpulse output periods A to G (FIG. 2), the periods B to G (FIG. 3), the periods C to G (FIG. 4), the periods D to G (FIG. 5), the periods E to G, the periods F and G, the period G, and no adjustment pulse output period (FIG. 6) of the adjustment pulse are set in binary to "000", "001", "010", "011", "100", "101", "110", and "111", the pulse driving rank selecting circuit 11 may be configured as a 3-bit binary counter. Note that, the values of the counter correspond to ranks.

Then, the pulse driving rank selecting circuit 11 counts up (is incremented) and selects a waveform pattern which outputs the adjustment pulse less when the rotation detecting circuit 10 detects that the rotor has not rotated, and counts down (is decremented) and selects a waveform pattern which outputs the adjustment pulse more when the counter circuit 12 counts that the rotor has rotated the predetermined number of times.

Figure 7:
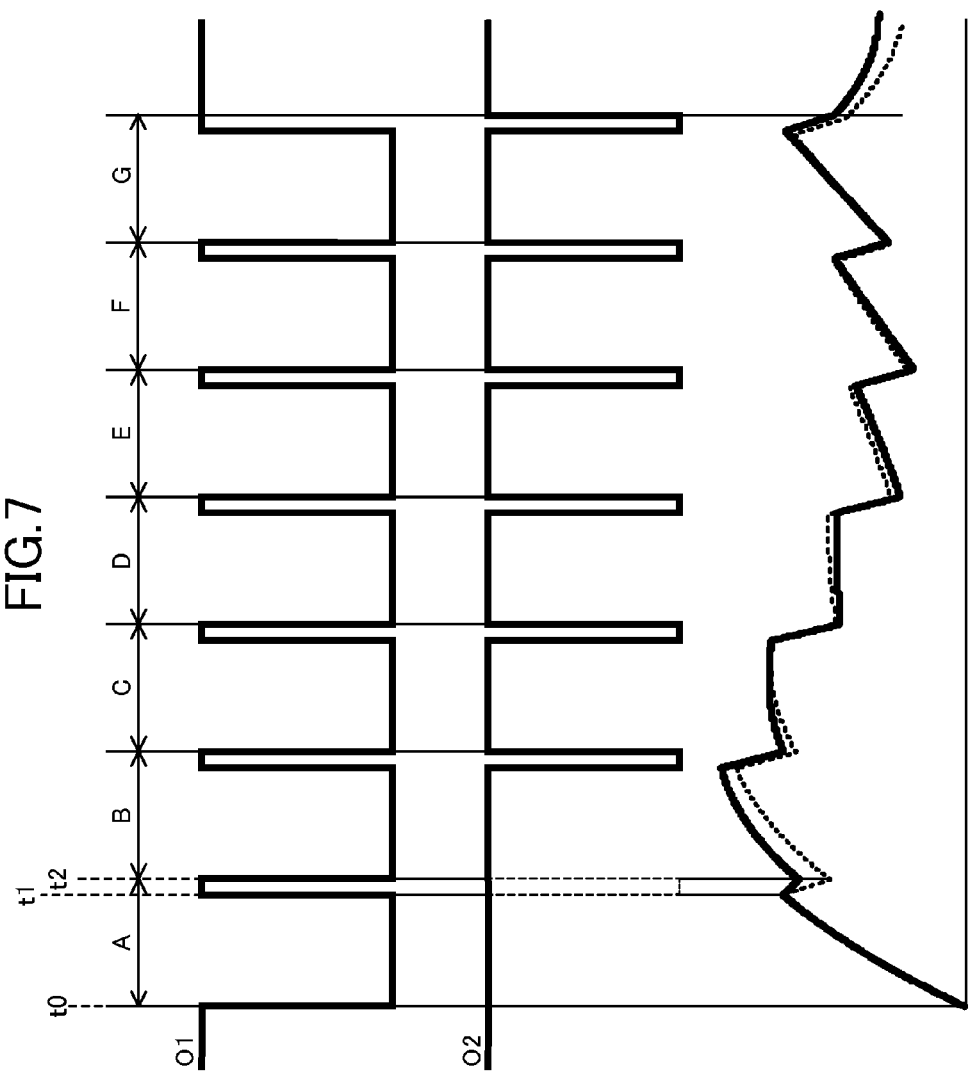
FIG. 7 is a waveform diagram of the pulses generated by the circuits of the electronic clock according to the first embodiment of the present invention and a waveform diagram of currents generated in a coil.
Figure 8:
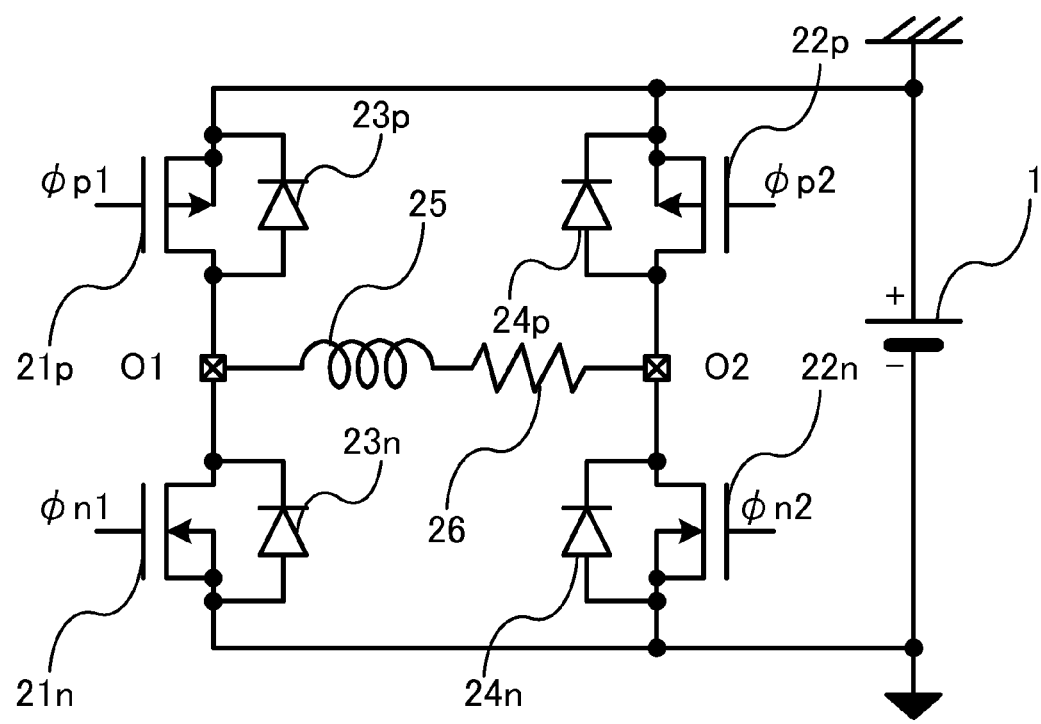
FIG. 8 is an equivalent circuit diagram illustrating a configuration of a motor driver of the electronic clock according to the first embodiment of the present invention.

Next, referring to FIGS. 7 to 9, operation of the motor driver 8 is described.

Figure 2:
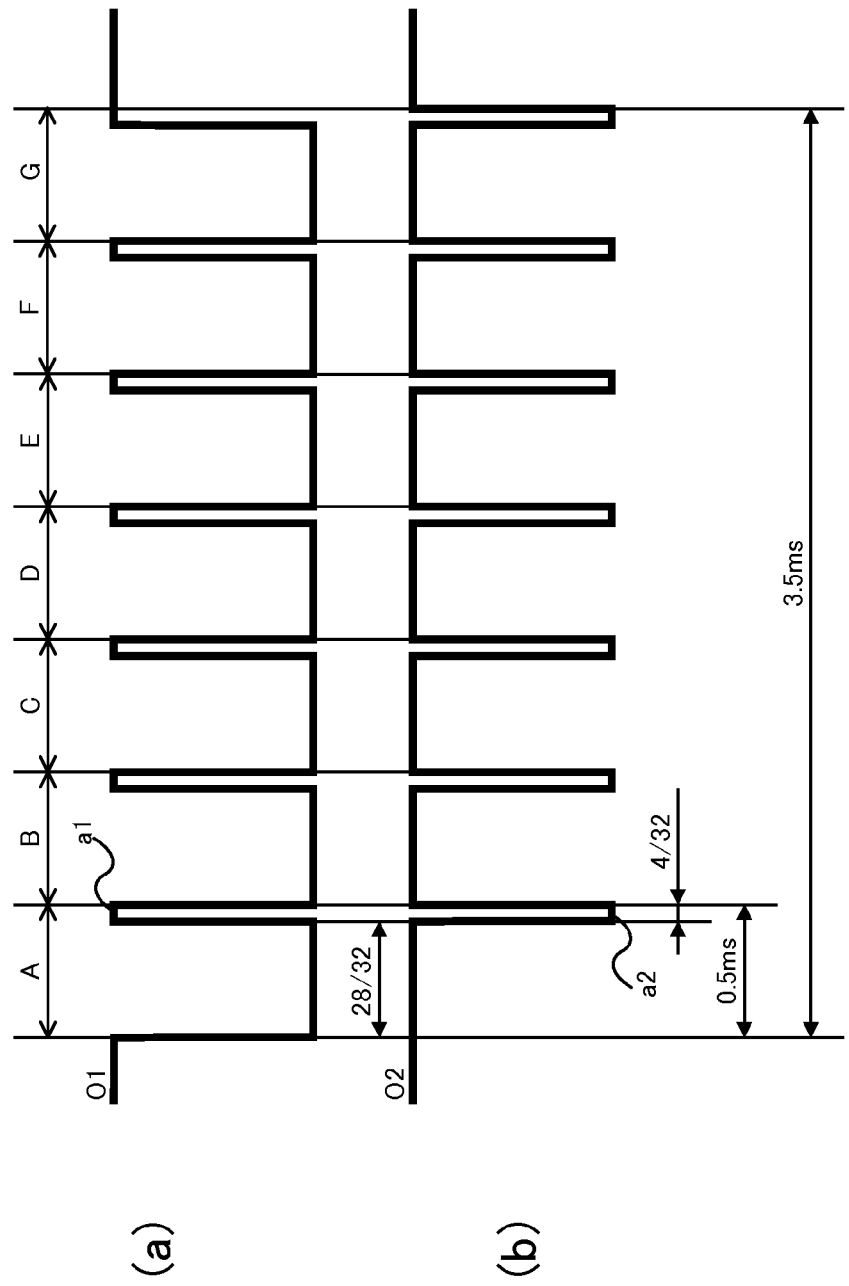
FIG. 2 is a waveform diagram of pulses generated by circuits of an electronic clock according to first, second, and third embodiments of the present invention.

The voltage waveforms in parts (a) and (b) of FIG. 7 have the same pulse width and the duty ratio as in FIG. 2. Part (c) of FIG. 7 shows current waveforms generated in the coil when the voltage waveforms in parts (a) and (b) of FIG. 7 are output, and illustrates a current waveform generated when the adjustment pulse is output in the period A by a broken line and a current waveform generated when the adjustment pulse is not output in the period A by a solid line.

FIG. 8 is an equivalent circuit diagram illustrating a configuration of the motor driver 8. Reference symbol 21p denotes a PMOS transistor having a gate to which a control signal φp1 is input and a source connected to a positive side of the power source 1, and being connected to the O1 terminal on a drain side, reference symbol 21n denotes an NMOS transistor having a gate to which a control signal φn1 is input and a source connected to a negative side of the power source 1, and being connected to the O1 terminal on a drain side, and parasitic diodes 23p and 23n generated because of the structure of the MOS transistors are connected between the source and the drain of the respective MOS transistors. Moreover, reference symbol 22p denotes a PMOS transistor having a gate to which a control signal φp2 is input and a source connected to the positive side of the power source 1, and being connected to the O2 terminal on a drain side, reference symbol 22n denotes an NMOS transistor having a gate to which a control signal φn2 is input and a source connected to the negative side of the power source 1, and being connected to the O2 terminal on a drain side, and parasitic diodes 24p and 24n generated because of the structure of the MOS transistors are connected between the source and the drain of the respective MOS transistors. Between the O1 terminal and the O2 terminal, a coil 25 constructing the stepping motor 9 and a DC resistance component 26 of the coil 25 are connected in series. Note that, the control signals φp1, φn1, φp2, and φn2 input to the gate of the respective MOS transistors 21p, 21n, 22p, and 22n are signals constructing the normal driving pulse and the adjustment pulse.

Specifically, the original signals output from the normal driving pulse generating circuit 3 are output as φp1 and φn1 via the selector 7, and the original signals output from the adjustment pulse generating circuit 4 are output as φp2 and φn2 via the selector 7. The motor driver 8 is substantially configured as an inverter, and both the original signals are output as signals inverted from those shown in FIGS. 2 to 6, with the result that the signal waveforms shown in FIGS. 2 to 6 is output from O1 and O2.

In FIG. 7, normally (before time t0), both the O1 terminal and the O2 terminal have the same potential at GND(+), and hence the motor driver 8 is in an equivalent circuit state as illustrated in FIG. 9(a). More specifically, both the PMOS transistors 21p and 22p are turned on and hence respectively illustrated as low-value resistors 210p and 220p. Moreover, both the NMOS transistors 21n and 22n are turned off and hence respectively illustrated as the parasitic diodes 23n and 24n. In this case, both the O1 terminal and the O2 terminal have the same potential at GND(+), and hence the amount of current flowing through the coil 25 is zero.

At time t0, the normal driving pulse from the normal driving pulse generating circuit 3 is selected by the selector 7 for output from the motor driver 8 so that the O1 terminal becomes a Low level and the O2 terminal becomes a High level, with the result that a current flows through the coil 25 and the stepping motor 9 starts rotating. At this time, the motor driver 8 is in an equivalent circuit state as illustrated in FIG. 9 (b). More specifically, both the PMOS transistor 22p and the NMOS transistor 21n are turned on and hence respectively illustrated as low-value resistors 220p and 210n. Moreover, both the PMOS transistor 21p and the NMOS transistor 22n are turned off and hence respectively illustrated as the parasitic diodes 23p and 24n. A current 31 flowing through the motor driver 8 flows from the power source 1 in a direction of the low-value resistor 220p→the O2 terminal→the series resistance component 26→the coil 25→the O1 terminal→the low-value resistor 210n and is in a direction of consumption.

At time t1, the normal driving pulse is stopped. Both the O1 terminal and the O2 terminal become the same potential at GND(+), and the current flowing through the coil 25 is shut off. However, as illustrated by the broken line in part (c) of FIG. 7, the amount of current flowing through the coil does not become zero immediately.

At this time, the motor driver 8 is in an equivalent circuit state as illustrated in FIG. 9 (c). More specifically, both the PMOS transistors 21p and 22p are turned on and hence respectively illustrated as low-value resistors 210p and 220p. Moreover, both the NMOS transistors 21n and 22n are turned off and hence respectively illustrated as the parasitic diodes 23n and 24n. A current 32 flowing through the motor driver 8 flows from the coil 25 in a direction of the O1 terminal→the low-value resistor 210p→the low-value resistor 220p→the O2 terminal→the series resistance component 26.

Then, when the adjustment pulse is output immediately thereafter (the broken line shown in part (b) of FIG. 7), the O1 terminal becomes the High level and the O2 terminal becomes the Low level, which is opposite to the driving pulse from time t0 to t1 for rotating the stepping motor 9. Then, the motor driver 8 becomes an equivalent circuit state as illustrated in FIG. 9(d). More specifically, both the PMOS transistor 21p and the NMOS transistor 22n are turned on and hence respectively illustrated as low-value resistors 210p and 220n. Moreover, both the PMOS transistor 22p and the NMOS transistor 21n are turned off and hence respectively illustrated as the parasitic diodes 24p and 23n.

At this time, the coil 25 generating an electromotive force and the power source 1 are configured to be connected in parallel via the low-value resistor 210p, the low-value resistor 220n, and the series resistance component 26. More specifically, a current obtained by combining a current 33 flowing from the coil 25 in a direction of the O1 terminal→the low-value resistor 210p→the power source 1→the low-value resistor 220n→the O2 terminal→the series resistance component 26 and a current 34 flowing from the power source 1 in a direction of the low-value resistor 210p→the O1 terminal→the coil 25→the series resistance component 26→the O2 terminal→the low-value resistor 220n flows in the motor driver 8, but a time width of the normal driving pulse from time t0 to t1 is large enough with respect to a time width of the adjustment pulse from time t1 to t2 so that the current 33 is dominant. The current 33 is in a direction of charging the power source 1 and recovering electricity, but at the same time, the current 33 which is in a direction of rotating the stepping motor 9 is reduced. Therefore, outputting the adjustment pulse reduces the driving force.

At time t2, the adjustment pulse is stopped, and the normal driving pulse from the normal driving pulse generating circuit 3 is selected by the selector 7 for output from the motor driver 8 so that the O1 terminal becomes the Low level and the O2 terminal becomes the High level, with the result that a current flows through the coil 25 in the direction of rotating the stepping motor 9. More specifically, both the O1 terminal and the O2 terminal instantaneously become the same potential at GND(+), and hence the motor driver 8 returns via the equivalent circuit state as in FIG. 9(c) back to the equivalent circuit state as illustrated in FIG. 9(b), which ends an operation in the period A. The above-mentioned operation is repeated for the periods B to G.

Note that, the time width of the adjustment pulse from time t1 to t2 needs to be at least smaller than the time width of the normal driving pulse from time t0 to t1. This is because, when the time width of the adjustment pulse is larger than the time width of the normal driving pulse, there is a fear that the rotation of the stepping motor 9 may be affected.

On the other hand, when the adjustment pulse is not output from time t1 to t2 (the solid line shown in part (b) of FIG. 7), both the O1 terminal and the O2 terminal become the same potential at GND(+), and the current flowing through the coil 25 is shut off. Note, however, that as illustrated by the solid line of part (c) of FIG. 7, the amount of current flowing through the coil does not become zero immediately. At this time, the motor driver 8 is in the equivalent circuit state as illustrated in FIG. 9(c), and the current 32 keeps the stepping motor 9 rotating. As compared to when the adjustment pulse is output, there is no current component for reducing the current in the rotation direction, and hence the driving force becomes higher. In other words, the driving force of the stepping motor 9 may be controlled by whether or not the adjustment pulse is output.

Subsequently, operation of the configuration of FIG. 1 is described. First, the pulse of FIG. 2 in which the adjustment pulse is output in all the periods A to G is used for driving. When the rotation detecting circuit 6 determines that the rotor has not rotated, the compensation driving pulse is output to reliably rotate the stepping motor 9, and at the same time, the value of the pulse driving rank selecting circuit 11 is incremented from "000" to "001", on the basis of which the pulse of FIG. 3 in which the adjustment pulse is output in the periods B to G is selected. In the next step, the pulse of FIG. 3 having a higher driving force than the pulse of FIG. 2 is used to drive the stepping motor 9.

Figure 3:
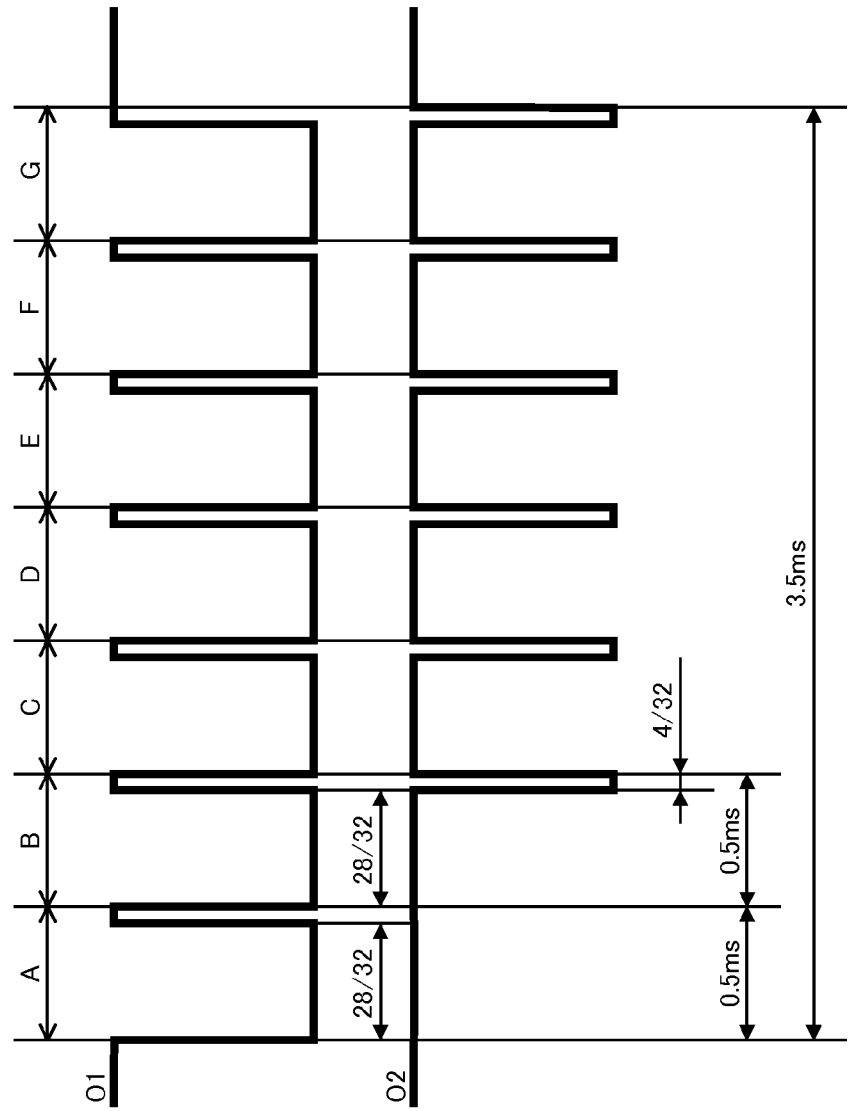
FIG. 3 is a waveform diagram of the pulses generated by the circuits of the electronic clock according to the first, second, and third embodiments of the present invention.
Figure 4:
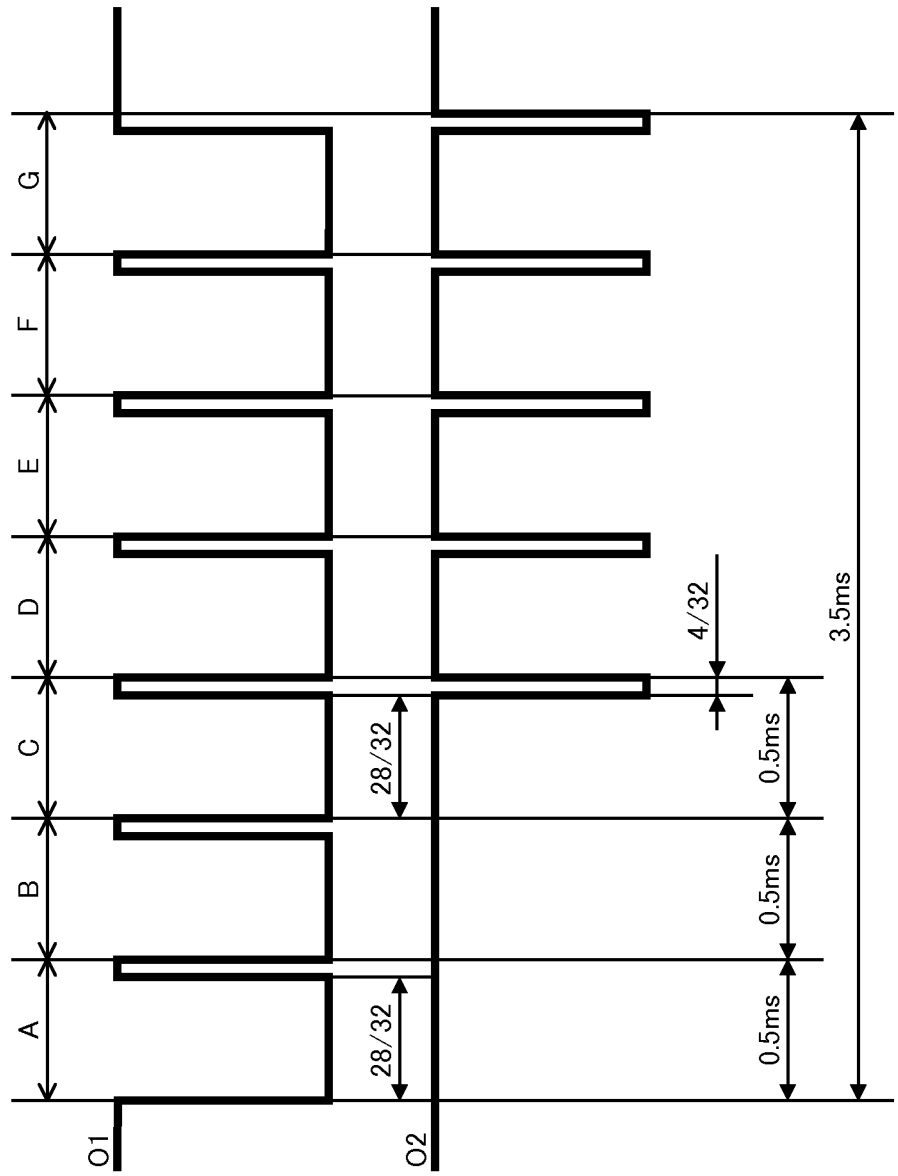
FIG. 4 is a waveform diagram of the pulses generated by the circuits of the electronic clock according to the first embodiment of the present invention.

Moreover, when the rotation detecting circuit 6 determines that the rotor has not rotated even with the use of the pulse of FIG. 3 for driving, the compensation driving pulse is output to reliably rotate the stepping motor 9, and at the same time, the value of the pulse driving rank selecting circuit 11 is incremented from "001" to "010", on the basis of which the pulse of FIG. 4 in which the adjustment pulse is output in the periods C to G is selected. In the next step, the pulse of FIG. 4 having a higher driving force than the normal driving pulse of FIG. 3 is used to drive the stepping motor 9.

Figure 5:
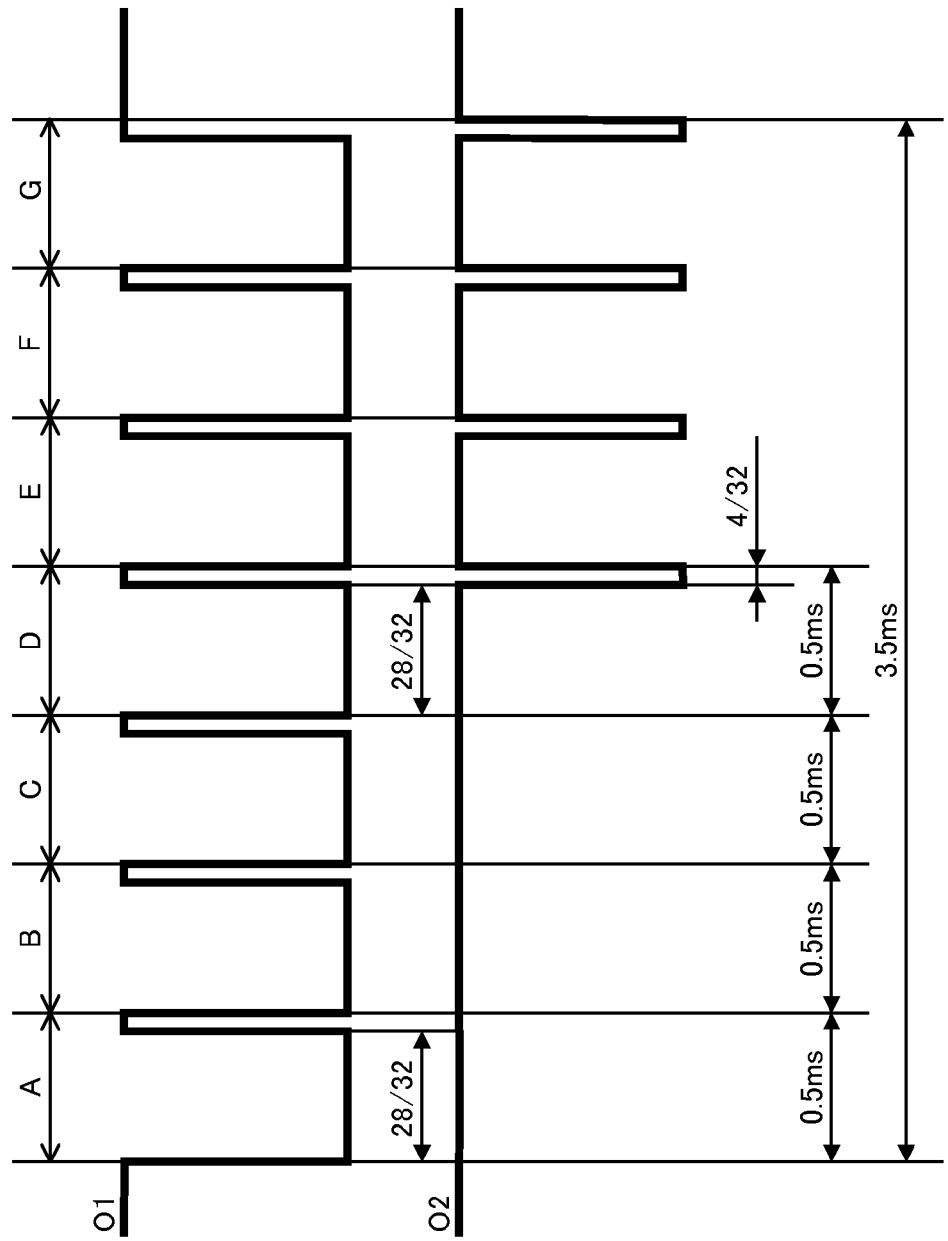
FIG. 5 is a waveform diagram of the pulses generated by the circuits of the electronic clock according to the first embodiment of the present invention.
Figure 6:
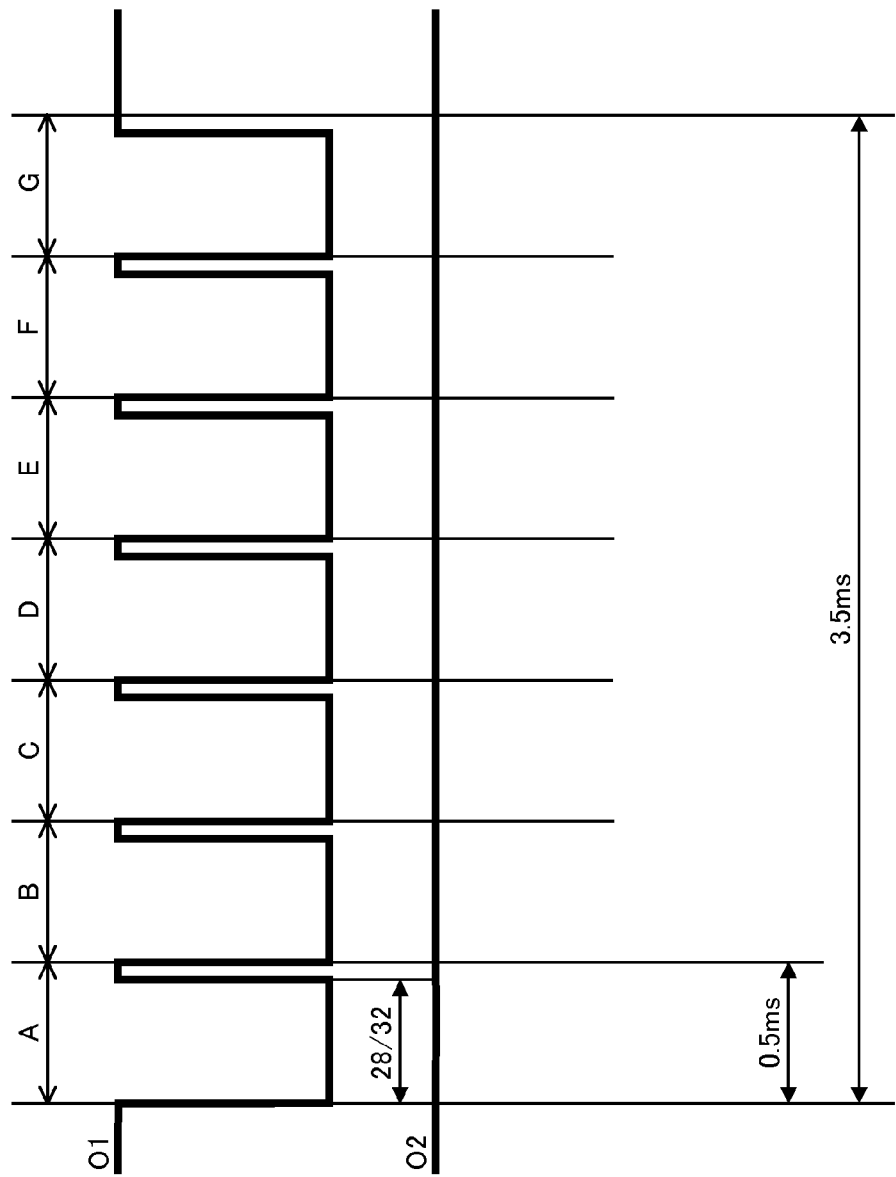
FIG. 6 is a waveform diagram of the pulses generated by the circuits of the electronic clock according to the first embodiment of the present invention.

Further, also when the rotation detecting circuit 6 determines that the rotor has not rotated even with the use of the pulse of FIG. 4 for driving, the compensation driving pulse is output to reliably rotate the stepping motor 9, and at the same time, the value of the pulse driving rank selecting circuit 11 is incremented from "010" to "011", on the basis of which the pulse of FIG. 5 in which the adjustment pulse is output in the periods D to G is selected. In the next step, the pulse of FIG. 5 having a higher driving force than the pulse of FIG. 4 is used to drive the stepping motor 9. When the value is finally incremented to "111", the pulse of FIG. 6 in which no adjustment pulse is output in any of the periods A to G is selected to drive the stepping motor 9. In this manner, the output of the adjustment pulse is stopped sequentially from the period A to the period G to increase the driving force.

Then, if the pulse of FIG. 5 is used for driving, and when the counter circuit 12 illustrated in FIG. 1 counts a detection signal, which is generated by the rotation detecting circuit 10 determining that the rotor has rotated, as the rotation a predetermined number of times (for example, 256 times) in succession, the value of the pulse driving rank selecting circuit 11 is decremented from "011" to "010", and the pulse of FIG. 4 having a lower driving force than that of FIG. 5 is selected to drive the stepping motor 9. Also in the case where the pulse of FIG. 4 is used for driving, when the counter circuit 12 counts the signal, which is generated by the rotation detecting circuit 10 determining that the rotor has rotated, as the rotation the predetermined number of times in succession, the value of the pulse driving rank selecting circuit 11 is decremented from "010" to "001", and the pulse of FIG. 3 is used to drive the stepping motor 9. Further, also in the case where the pulse of FIG. 2 is used for driving, when the counter circuit 12 counts the signal, which is generated by the rotation detecting circuit 10 determining that the rotor has rotated, as the rotation the predetermined number of times in succession and the value of the pulse driving rank selecting circuit 11 is decremented, in the next step, the pulse of FIG. 1 is used to drive the stepping motor 9. In other words, the value is decremented sequentially one rank at a time from "111" to "000" when the counter circuit 12 counts the rotation the predetermined number of times in succession.

Next, FIG. 10 shows the applicants' experiment measurement results comparing amounts of change in current consumption per rank of the stepping motor 9 having ranks "000", "001", "010", "011", "100", "101", "110", and "111" according to the first embodiment, and amounts of change in current consumption per rank of the stepping motor 9 in which all duty ratios are changed in steps of 1/32 from 21/32 to 28/32 (corresponding to the rank "111" in the first embodiment) for each chopper of a normal driving pulse according to the related art.

Solid circle plots in FIG. 10 show the measurement results of the first embodiment, and respectively represent ranks "000", "001", "010", "011", "100", "101", "110", and "111" from the plot on the left side on the drawing. Open square plots show the measurement results of the related-art configuration, and respectively represent duty ratios of 21/32, 22/32, 23/32, 24/32, 25/32, 26/32, 27/32, and 28/32 from the plot on the left side on the drawing. In the related-art configuration, the amounts of change in current consumption for each rank up are 30 nA to 50 nA, while in the first embodiment, the amounts of change are suppressed to 20 nA to 30 nA, which demonstrates the ability to finely control the driving force.

More specifically, in the related art, all duty ratios are changed in steps of 1/32 for each chopper of the normal driving pulse, and in the first embodiment, for example, the number of normal driving pulses is 7 so that the amount of change in execution duty for each rank up is 1/32×7 (number of pulses)=7/32. However, the present invention employs the method in which the output of the adjustment pulse is stopped sequentially one pulse at a time from the period A to the period G, and in the first embodiment, for example, the duty of the adjustment pulses is set to 4/32 so that the amount of change in execution duty for each rank up is 4/32, which enables finer control on the driving force as compared to the related art.

As described above, according to the present invention, only the output pattern of the adjustment pulse is controlled without changing the normal driving pulse to enable the fine control on the driving force without using a multiplying circuit or the like, and at the same time, to enable suppression in an amount of increase in current consumption when the driving force is varied to a small value and reduction in individual variation in current consumption.

[Second Embodiment]

A second embodiment is an example of a control method for further reducing the amount of change in driving force for each rank up as compared to the first embodiment. Now, the second embodiment according to the present invention is described with reference to the drawings.

Figure 11:
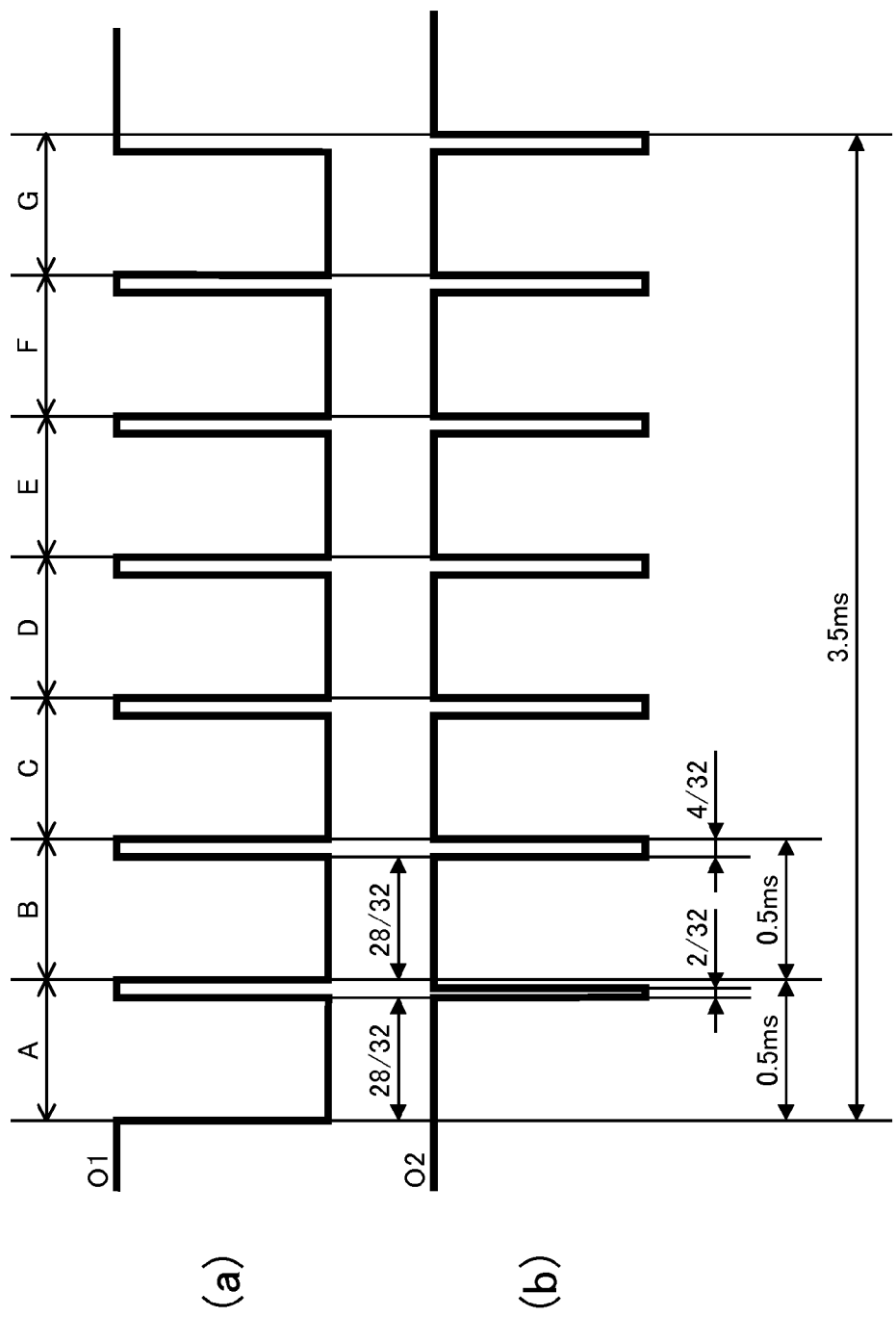
FIG. 11 is a waveform diagram of the pulses generated by the circuits of the electronic clock according to the second and third embodiments of the present invention.

A block diagram illustrating a circuit configuration of an electronic clock according to the second embodiment is the same as FIG. 1, which is incorporated herein for description. FIG. 11 is a waveform diagram of the normal driving pulses generated by the circuits of the electronic clock according to the second embodiment of the present invention, in which part (a) shows a voltage waveform generated at one terminal O1 of the coil, and part (b) shows a voltage waveform generated at the other terminal O2 of the coil. Note that, the waveforms generated at the terminals O1 and O2 are alternate pulses which reverse phases for each step. FIGS. 2 and 3 are also the waveform diagrams of the normal driving pulses generated by the circuits of the electronic clock according to the second embodiment of the present invention, which are the same as in the first embodiment and incorporated herein. Note that, the same components as those described in the first embodiment are denoted by the same numerals and description thereof is omitted.

The description of FIG. 1 is the same as that given in the first embodiment, which is referenced for overlapping parts. In this embodiment, the adjustment pulse generating circuit 4 generates, with reference to the reference signal generating circuit 2, the adjustment pulses having chopper duty ratios of 4/32 and 2/32 as shown in part (b) of FIGS. 2, 3, and 11. The adjustment pulses are each output during the output OFF period of the normal driving pulse. The adjustment pulses include the one in part (b) of FIG. 2 in which the duty ratio of the adjustment pulse in the period A is 4/32, the one in part (b) of FIG. 3 in which the adjustment pulse is not output in the period A, and the one in part (b) of FIG. 11 in which the duty ratio of the adjustment pulse in the period A is 2/32, and for the periods B to G, the adjustment pulses are configured to have the duty ratio of 4/32. The adjustment pulse generating circuit 4 selects and outputs, with reference to the pulse driving rank selecting circuit 11, one of the different waveform patterns of the adjustment pulse. As to the operation of the motor driver 8, the output method of the adjustment pulses is the same, and hence description thereof is omitted. Note that, the reduction in duty ratio leads to the smaller time width of the adjustment pulses, and hence the amount of decrease in the current 33 of FIG. 9(*d*), which is in the direction of rotating the stepping motor 9, becomes smaller and the driving force is increased.

Next, in the pulse driving rank selecting circuit 11, when values of the pulse driving rank selecting circuit 11 for selecting the duty ratios of 4/32 (FIG. 2), 2/32 (FIG. 11), and 0/32 (FIG. 3, no adjustment pulse is output) in the adjustment pulse output period A are set in binary to "00", "01", and "10", the pulse driving rank selecting circuit 11 may be configured as a 2-bit binary counter. Note that, the values of the counter correspond to ranks as in the first embodiment. Then, the pulse driving rank selecting circuit 11 counts up (is incremented) and selects, when the rotation detecting circuit 10 detects that the rotor has not rotated, a waveform pattern in which the adjustment pulse has a small duty ratio, and counts down (is decremented) and selects, when the counter circuit 12 counts that the rotor has rotated the predetermined number of times, a waveform pattern in which the adjustment pulse has a large duty ratio.

Subsequently, operation of the configuration of FIG. 1 is described. First, the pulse of FIG. 2 in which the adjustment pulse having the duty ratio of 4/32 is output in the period A is used for driving. When the rotation detecting circuit 6 determines that the rotor has not rotated, the compensation driving pulse is output to reliably rotate the stepping motor 9, and at the same time, the value of the pulse driving rank selecting circuit 11 is incremented from "00" to "01", on the basis of which a pulse of FIG. 11 in which the adjustment pulse having the duty ratio of 2/32 is output in the period A is selected. In the next step, the pulse of FIG. 11 having a higher driving force than the pulse of FIG. 2 is used to drive the stepping motor 9.

Moreover, when the rotation detecting circuit 6 determines that the rotor has not rotated even with the use of the pulse of FIG. 11 for driving, the compensation driving pulse is output to reliably rotate the stepping motor 9, and at the same time, the value of the pulse driving rank selecting circuit 11 is incremented from "01" to "10", on the basis of which the pulse of FIG. 3 in which the adjustment pulse is not output in the period A is selected. In the next step, the pulse of FIG. 3 having a higher driving force than the normal driving pulse of FIG. 11 is used to drive the stepping motor 9. The duty ratios of the adjustment pulses are decreased sequentially as described above to increase the driving force.

Then, if the pulse of FIG. 3 is used for driving, and when the counter circuit 12 illustrated in FIG. 1 counts the detection signal, which is generated by the rotation detecting circuit 10 determining that the rotor has rotated, as the rotation a predetermined number of times (for example, 256 times) in succession, the value of the pulse driving rank selecting circuit 11 is decremented from "10" to "01", and is decremented sequentially one rank at a time down to "00" by the same procedure as described above as in the first embodiment.

As described above, in the second embodiment, the duty ratio of the adjustment pulse is changed to enable the fine control on the driving force. More specifically, in the second embodiment, the duty ratio of the adjustment pulse is changed in steps of 2/32, and hence the amount of change in execution duty for each rank up is 2/32. The amount of change in execution duty for each rank up is 4/32 in the first embodiment, and hence the amount of change in execution duty may be suppressed to approximately half as compared to the first embodiment. Here in the second embodiment, the duty ratio of the adjustment pulse is changed only in the period A, but the duty ratio of the adjustment pulse may be changed sequentially one pulse at a time also in the periods B to G by the same procedure in combination with the first embodiment to enable rank setting at an even higher resolution.

[Third Embodiment]

A third embodiment of the present invention is an example of a control method for reducing the amount of change in driving force for each rank up and at the same time enabling rank setting at a higher resolution as compared to the first and second embodiments. Now, the third embodiment according to the present invention is described with reference to the drawings.

Figure 12:
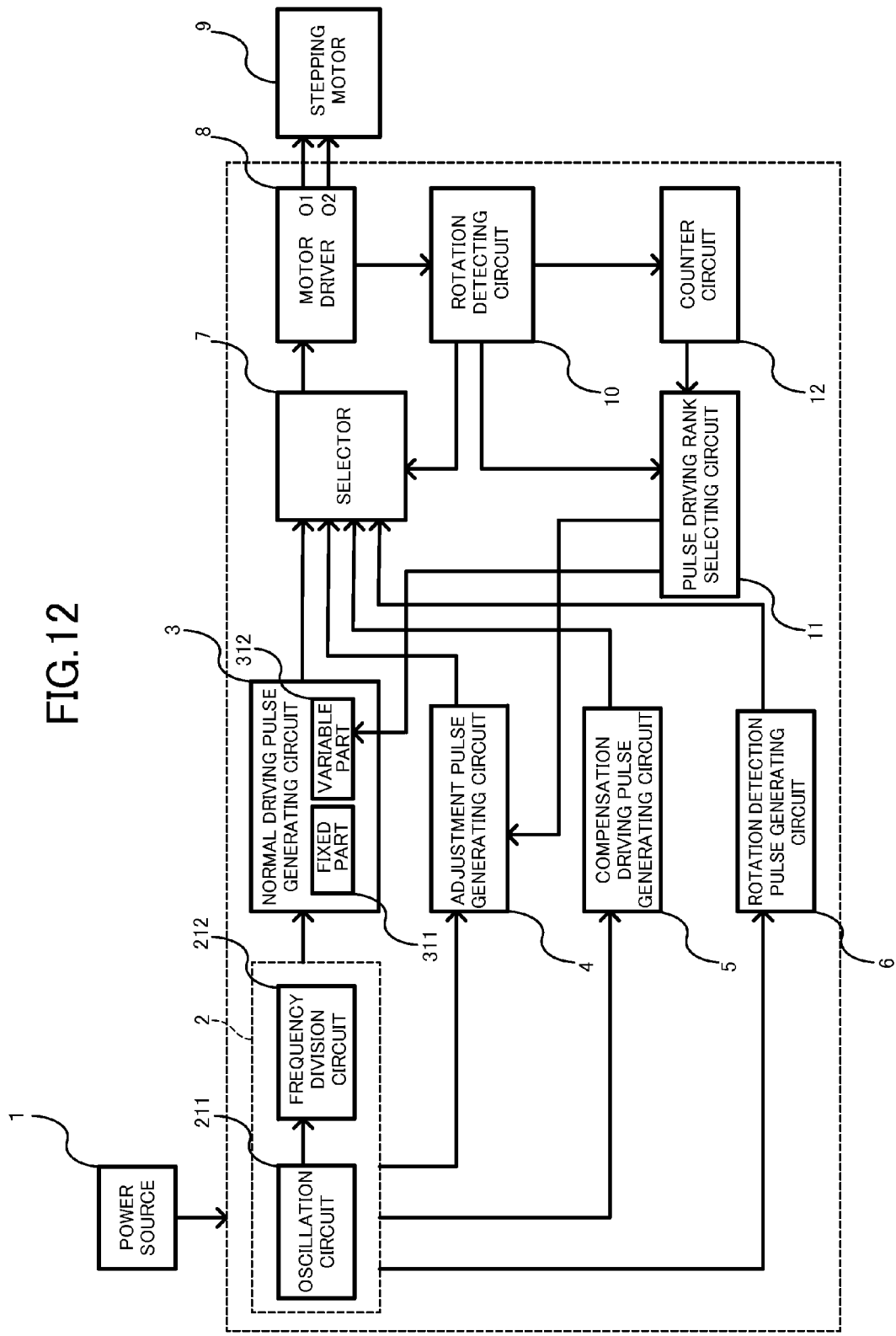
FIG. 12 is a block diagram illustrating a circuit configuration according to the third embodiment of the present invention.
Figure 13:
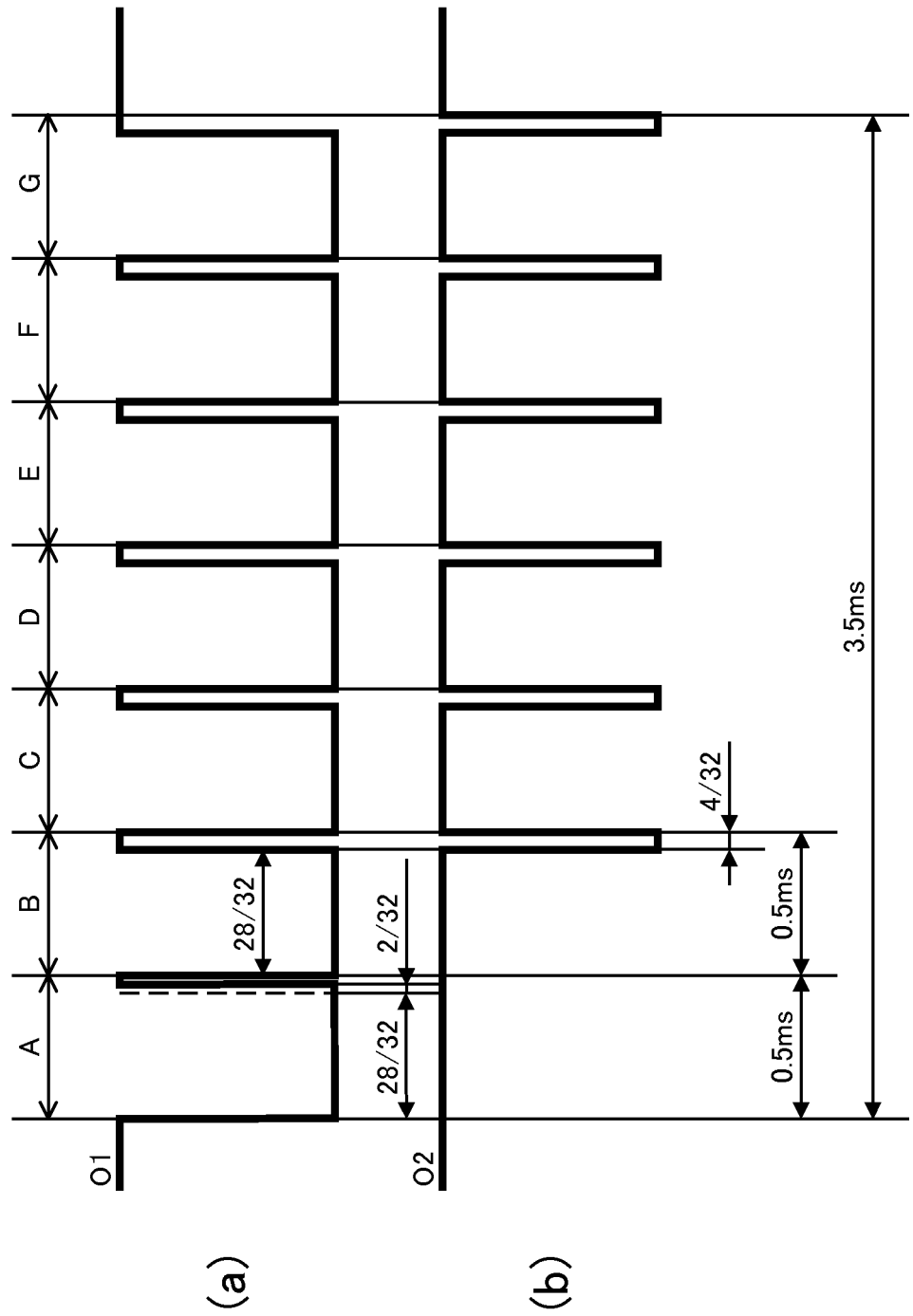
FIG. 13 is a waveform diagram of the pulses generated by the circuits of the electronic clock according to the third embodiment of the present invention.

FIG. 12 is a block diagram illustrating a circuit configuration of an electronic clock according to the third embodiment of the present invention, and FIGS. 13 and 14 are waveform diagrams of the normal driving pulses generated by circuits of the electronic clock according to the third embodiment of the present invention, in which part (a) shows a voltage waveform generated at one terminal O1 of the coil, part (b) shows a voltage waveform generated at the other terminal O2 of the coil, and part (c) shows current waveforms generated in the coil. Note that, the waveforms generated at the terminals O1 and O2 are alternate pulses which reverse phases for each step. FIGS. 2, 3, and 11 are also the waveform diagrams of the normal driving pulses generated by the circuits of the electronic clock according to the third embodiment of the present invention, which are the same as in the first and second embodiments and incorporated herein. FIG. 15 is a graph comparing changes in current consumption per rank of the stepping motors of the electronic clock according to the third embodiment of the present invention and the related-art electronic clock. Note that, the same components as those described in the first and second embodiments are denoted by the same numerals and description thereof is omitted.

In FIG. 12, the basic structure is the same as that of FIG. 1, and hence the first embodiment is referenced for overlapping parts. In this embodiment, the normal driving pulse generating circuit 3 includes a fixed part 311 for generating, with reference to the reference signal generating circuit 2, a normal driving pulse having the chopper duty ratio of 28/32 as shown in part (a) of FIGS. 2, 3, 11, 12, and 13, and a variable part 312 for generating normal driving pulses having chopper duty ratios of 0/32, 2/32, and 4/32 in the period A as respectively shown in part (a) of FIGS. 3, 12, and 13. The normal driving pulses of the variable part are configured to be output following that of the fixed part. The variable part 312 of the normal driving pulse generating circuit 3 selects and outputs a different chopper duty ratio with reference to the pulse driving rank selecting circuit 11.

In this embodiment, the adjustment pulse generating circuit 4 is the same as in the second embodiment, and hence description thereof is omitted.

Next, in the pulse driving rank selecting circuit 11, when the values of the pulse driving rank selecting circuit 11 for selecting the duty ratio of the adjustment pulse in the period A to be 4/32 (FIG. 2) and 2/32 (FIG. 11), the duty ratios of the adjustment pulse and the variable part 312 of the normal driving pulse to be 0/32 (FIG. 3), the duty ratio of the variable part 312 of the normal driving pulse to be 2/32 (FIG. 12) and 4/32 (FIG. 13) are set in binary to "000", "001", "010", "011", and "100", the pulse driving rank selecting circuit 11 may be configured as a 3-bit binary counter. Note that, the values of the counter correspond to ranks as in the first and second embodiments. Then, the pulse driving rank selecting circuit 11 counts up (is incremented) and selects, when the rotation detecting circuit 10 detects that the rotor has not rotated, a waveform pattern in which the adjustment pulse has a small duty ratio or the normal driving pulse has a large duty ratio, and counts down (is decremented) and selects, when the counter circuit 12 counts that the rotor has rotated the predetermined number of times, a waveform pattern in which the adjustment pulse has a large duty ratio or the normal driving pulse has a small duty ratio.

Subsequently, operation of the configuration of FIG. 12 is described. First, the pulse of FIG. 2 in which the adjustment pulse having the duty ratio of 4/32 is output in the period A is used for driving. When the rotation detecting circuit 6 determines that the rotor has not rotated, the compensation driving pulse is output to reliably rotate the stepping motor 9, and at the same time, the value of the pulse driving rank selecting circuit 11 is incremented from "000" to "001", on the basis of which a pulse of FIG. 11 in which the adjustment pulse having the duty ratio of 2/32 is output in the period A is selected. In the next step, the pulse of FIG. 11 having a higher driving force than the pulse of FIG. 2 is used to drive the stepping motor 9.

Moreover, when the rotation detecting circuit 6 determines that the rotor has not rotated even with the use of the pulse of FIG. 11 for driving, the compensation driving pulse is output to reliably rotate the stepping motor 9, and at the same time, the value of the pulse driving rank selecting circuit 11 is incremented from "001" to "010", on the basis of which the pulse of FIG. 3 in which the adjustment pulse is not output in the period A is selected. In the next step, the pulse of FIG. 3 having a higher driving force than the normal driving pulse of FIG. 11 is used to drive the stepping motor 9.

Further, when the rotation detecting circuit 6 determines that the rotor has not rotated even with the use of the pulse of FIG. 3 for driving, the compensation driving pulse is output to reliably rotate the stepping motor 9, and at the same time, the value of the pulse driving rank selecting circuit 11 is incremented from "010" to "011", on the basis of which switching is made from the output of the adjustment pulse to the output of the variable part 312 of the normal driving pulse to select a pulse of FIG. 13 in which the normal driving pulse having the duty ratio of 2/32 is output in the period A. In the next step, the pulse of FIG. 13 having a higher driving force than the normal driving pulse of FIG. 3 is used to drive the stepping motor 9. When the value is finally incremented to "100", the pulse of FIG. 14 in which the variable part 312 of the normal driving pulse has the duty ratio of 4/32 in the period A is selected to drive the stepping motor 9. In this manner, the duty ratio of the adjustment pulse is gradually reduced, and after the output of the adjustment pulse is stopped, switching is made to the output of the normal driving pulse to gradually increase the duty ratio of the variable part of the normal driving pulse, with the result that the driving force is increased sequentially. Then, if the pulse of FIG. 14 is used for driving, and when the counter circuit 12 illustrated in FIG. 12 counts the detection signal, which is generated by the rotation detecting circuit 10 determining that the rotor has rotated, as the rotation a predetermined number of times (for example, 256 times) in succession, the value of the pulse driving rank selecting circuit 11 is decremented from "100" to "011", and is decremented sequentially one rank at a time down to "000" by the same procedure as described above as in the first and second embodiments.

Next, FIG. 15 shows the applicants' experiment measurement results comparing amounts of change in current consumption per rank of the stepping motor 9 having ranks "000", "001", "010", "011", and "100" according to the third embodiment, and amounts of change in current consumption per rank of the stepping motor 9 in which all duty ratios are changed in steps of 1/32 from 24/32 to 28/32 for each chopper of a normal driving pulse according to the related art.

Solid circle plots in FIG. 15 show the measurement results of the third embodiment, and respectively represent ranks "000", "001", "010", "011", and "100" from the plot on the left side on the drawing. Open square plots show the measurement results of the related-art configuration, and respectively represent duty ratios of 26/32, 27/32, 28/32, 29/32, and 30/32 from the plot on the left side on the drawing. In the related-art configuration, the amounts of change in current consumption for each rank up are 40 nA to 50 nA, while in the third embodiment, the amounts of change are suppressed to 10 nA to 15 nA, which demonstrates the ability to finely control the driving force.

More specifically, in the related art, all duty ratios are changed in steps of 1/32 for each chopper of the normal driving pulse, and in the third embodiment, for example, the number of normal driving pulses is 7 so that the amount of change in execution duty for each rank up is 1/32×7 (number of pulses)=7/32. However, the present invention employs the method in which the output of the adjustment pulse or the output of the normal driving pulse is changed in step of the duty ratio of 2/32 in the period A so that the amount of change in execution duty for each rank up is 2/32, which enables finer control on the driving force as compared to the related art.

As described above, in the third embodiment, the duty ratio of the adjustment pulse or the duty ratio of the variable part of the normal driving pulse is changed to enable the fine control on the driving force. Here in the third embodiment, the duty ratio of the adjustment pulse or the variable part of the normal driving pulse is changed only in the period A, but the duty ratio of the adjustment pulse or the duty ratio of the normal driving pulse may be changed sequentially one pulse at a time also in the periods B to G by the same procedure in combination with the first embodiment to enable rank setting at an even higher resolution.

The embodiments of the present invention have been described above in detail with reference to the drawings. However, the embodiments are merely examples of the present invention, and the present invention is not limited to the configuration of the embodiments. Therefore, it should be understood that design changes and the like are encompassed by the present invention without departing from the spirit of the present invention. Therefore, the following changes may be made.

(1) In the above description, the pulse driving rank selecting circuit 11 is configured as the 3-bit binary counter in the first embodiment, for example, and the description has been given of the driving force control with the 8 types of pulses. However, there may be adopted a method in which the number of bits of the pulse driving rank selecting circuit 11 is increased to obtain a configuration in which, for example, 16 types of driving forces are obtained with a 4-bit configuration, so that the range of the driving force of the normal driving pulse may be increased or the driving force may be controlled more finely.

(2) The values of the chopper duty ratios of the normal driving pulse and the adjustment pulse, the number of pulses, the chopper period, and other such numerical values are not limited to the above-mentioned numerical values, and may be optimized for the motor and indicators (hands, a date wheel, and the like) to be attached.

(3) The block diagram illustrated in FIG. 1 or 12 is exemplary, and other components may be included as long as the above-mentioned operation is performed. The method of configuring the system in the block diagram may be random logic control or microcomputer control. It is also possible to adopt a configuration in which the selector 7 includes a microcomputer and the other circuits are configured as random logic. In this manner, changes for application to various models may be made relatively easily.

(4) The first embodiment adopts the configuration in which the output of the subpulses of the adjustment pulse is stopped in the sequence A→B→C . . . so as to be stopped from the head with the start of output of the driving pulse being the origin, but the present invention is not limited thereto.

For example, the output of the subpulses may be stopped from the center part, such as C, D, E, or in the sequence G→F→E . . . so as to be stopped from the tail.

Stopping the output of the subpulses of the adjustment pulse increases the driving force in those parts, and hence may be determined in consideration of the motor driving state.

(5) In the first embodiment, the decreased number of the subpulses of the adjustment pulse is one at a time, but two or more subpulses may be changed at once.

(6) The second embodiment gives an example in which the duty ratio of the adjustment pulse is changed by one subpulse, but the duty ratio may be changed by a plurality of (including all) subpulses. In addition, the second embodiment gives an example combined with the first embodiment in which the number of subpulses is decreased, but may be embodied without decreasing the subpulses.

(7) The first to third embodiments of the present invention give examples of rank control in which a control is performed based on whether or not the stepping motor 9 has rotated, but the present invention is not limited thereto. For example, the control may be performed by a power source state detecting circuit for detecting a power source state of the power source 1 (normally a battery). The power source state detecting circuit may be, for example, a power source voltage detecting circuit for detecting a storage amount (also referred to as remaining capacity) of the power source 1. Alternatively, when the power source 1 is a rechargeable secondary battery, the power source state detecting circuit may be a power generation state detecting circuit for detecting a power generation state of a power generation source for charging the power source 1. The control as described in the first to third embodiments of the present invention is performed based on the detection results of the power source state detecting circuit to enable finer driving control on the stepping motor 9 depending on the state of the power source 1. It should be understood that the control may be performed in consideration of both the power source state and the rotation/no rotation.

(8) What is driven by the stepping motor 9, which is subjected to the driving force control in the first to third embodiments of the present invention, is not particularly limited, and may be hands of time such as hour, minute, and second hands, functional hands indicating information other than time information, such as chronograph hands, altimeter/bathometer hands, a hand of a power reserve meter, wheels such as a date wheel and a day-of-the-week wheel, or a retrograde. Moreover, the operation of what is driven when the driving force control is performed is not limited to normal operation, and may be other special operation such as fast forwarding.

(9) The fine control on the driving force using the adjustment pulse described in the first to third embodiments of the present invention and the related-art driving force control in which the duty ratio of the chopper of the normal driving pulse is changed may be used in combination. At this time, the fine control on the driving force using the adjustment pulse may be used during usual hand movement, and is suited for compensation for individual differences of the electronic clock near a stable point or a change in power source voltage accompanying charging/discharging. On the other hand, the related-art driving force control in which the duty ratio of the chopper of the normal driving pulse is changed may be used when driving the calendar (more specifically, a date wheel or a day-of-the-week wheel), when using various additional functions, or the like, and is suited for a case where the motor load temporarily undergoes a significant change.

The invention claimed is:

1. An electronic clock, comprising:
a bipolar stepping motor;
a motor driver including two driving terminals for driving the stepping motor;
a driving pulse generating circuit for generating a chopper driving pulse that is one group of several choppers for driving the stepping motor;
a selector for outputting the generated chopper driving pulse, which has been generated by the driving pulse generating circuit, to the motor driver; and
an adjustment pulse generating circuit for generating an adjustment pulse, which is output in an OFF period between outputs of the choppers of the chopper driving pulse during an ON period of the one group of the chopper driving pulse, to the selector,
wherein the selector outputs the original signal of the adjustment pulse to the motor driver so that the adjustment pulse is output from a driving terminal that is different from a driving terminal from which the chopper driving pulse is output,
wherein the adjustment pulse generating circuit generates a plurality of different kinds of the adjustment pulses, and wherein the electronic clock further comprises a specifying circuit for selecting one of the plurality of different kinds of the adjustment pulses and instructing the adjustment pulse generating circuit to output the selected one of the plurality of different kinds of the adjustment pulses, wherein the chopper driving pulse has a plurality of OFF periods, and wherein the adjustment pulse includes a plurality of small pulses corresponding to the plurality of OFF periods, and the plurality of different kinds of adjustment pulses have different numbers and output positions of the plurality of small pulses.

2. The electronic clock according to claim 1, wherein the driving pulse generating circuit is configured to be capable of generating a plurality of chopper driving pulses in which duties of at least some chopper subpulses of the plurality of chopper driving pulses are different from each other, and outputs selected one of the plurality of chopper driving pulses to the selector in response to an instruction of the specifying circuit.

3. The electronic clock according to claim 1, further comprising a rotation detecting circuit for detecting whether or not the stepping motor has rotated, wherein the specifying circuit gives an instruction to the adjustment pulse generating circuit based on a detection result of the rotation detecting circuit.

4. The electronic clock according to claim 3, wherein less adjustment pulses are generated when the rotation detection circuit determines that the motor has not rotated.

5. The electronic clock according to claim 3, wherein more adjustment pulses are generated when the rotation detection circuit determines that the motor has rotated a predetermined number of times.

6. The electronic clock according to claim 1, further comprising a power source state detecting circuit for detecting a power source state, wherein the specifying circuit gives an instruction to the adjustment pulse generating circuit based on a detection result of the power source state detecting circuit.

7. The electronic clock according to claim 1, wherein the adjustment pulse suppresses the chopper driving pulse.

8. The electronic clock according to claim 1, wherein the bipolar motor is controlled without using a multiplier circuit.

9. The electronic clock according to claim 1, wherein the adjustment pulse and the chopper driving pulse are alternate pulses which reverse phases for each step.

10. The electronic clock according to claim 1, wherein the different numbers and output positions of the plurality of small pulses rotate the bipolar stepper motor in different amounts of rotation.

11. An electronic clock, comprising:
a bipolar stepping motor;
a motor driver including two driving terminals for driving the stepping motor;
a driving pulse generating circuit for generating a chopper driving pulse that is one group of several choppers for driving the stepping motor;
a selector for outputting the generated chopper driving pulse, which has been generated by the driving pulse generating circuit, to the motor driver; and
an adjustment pulse generating circuit for generating an adjustment pulse, which is output in an OFF period between outputs of the choppers of the chopper driving pulse during an ON period of the one group of the chopper driving pulse, to the selector, wherein the selector outputs the original signal of the adjustment pulse to the motor driver so that the adjustment pulse is output from a driving terminal that is different from a driving terminal from which the chopper driving pulse is output, wherein the adjustment pulse generating circuit generates a plurality of different kinds of the adjustment pulses, and wherein the electronic clock further comprises a specifying circuit for selecting one of the plurality of different kinds of the adjustment pulses and instructing the adjustment pulse generating circuit to output the selected one of the plurality of different kinds of the adjustment pulses wherein the plurality of different kinds of adjustment pulses are configured so that widths of some of a plurality of small pulses are smaller than widths of others of the plurality of small pulses that occur within the same pulse stream.

12. The electronic clock according to claim 11, wherein the driving pulse generating circuit is configured to be capable of generating a plurality of chopper driving pulses in which duties of at least some chopper subpulses of the plurality of chopper driving pulses are different from each other, and outputs selected one of the plurality of chopper driving pulses to the selector in response to an instruction of the specifying circuit.

13. The electronic clock according to claim 11, further comprising a rotation detecting circuit for detecting whether or not the stepping motor has rotated, wherein the specifying circuit gives an instruction to the adjustment pulse generating circuit based on a detection result of the rotation detecting circuit.

14. The electronic clock according to claim 13, wherein less adjustment pulses are generated when the rotation detection circuit determines that the motor has not rotated.

15. The electronic clock according to claim 13, wherein more adjustment pulses are generated when the rotation detection circuit determines that the motor has rotated a predetermined number of times.

16. The electronic clock according to claim 11, further comprising a power source state detecting circuit for detecting a power source state, wherein the specifying circuit gives an instruction to the adjustment pulse generating circuit based on a detection result of the power source state detecting circuit.

17. The electronic clock according to claim 11, wherein the adjustment pulse suppresses the chopper driving pulse.

18. The electronic clock according to claim 11, wherein the bipolar motor is controlled without using a multiplier circuit.

19. The electronic clock according to claim 11, wherein the adjustment pulse and the chopper driving pulse are alternate pulses which reverse phases for each step.

* * * * *